(12) United States Patent
Gangwar et al.

(10) Patent No.: US 10,635,774 B2
(45) Date of Patent: Apr. 28, 2020

(54) INTEGRATED CIRCUIT DESIGN

(71) Applicant: Arm Limited, Cambridge (GB)

(72) Inventors: Anup Gangwar, Austin, TX (US);
Nitin Kumar Agarwal, Bangalore (IN)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/261,643

(22) Filed: Jan. 30, 2019

(65) Prior Publication Data
US 2019/0266308 A1 Aug. 29, 2019

(30) Foreign Application Priority Data
Feb. 26, 2018 (GB) .................................. 1803048.6

(51) Int. Cl.
*G06F 17/50* (2006.01)
*G06N 3/12* (2006.01)

(52) U.S. Cl.
CPC ......... *G06F 17/5077* (2013.01); *G06N 3/126* (2013.01); *G06F 2217/02* (2013.01); *G06F 2217/06* (2013.01)

(58) Field of Classification Search
USPC ........................................................ 716/126
See application file for complete search history.

(56) References Cited

U.S. PATENT DOCUMENTS 7,561,534 B2 *  7/2009  Alicherry ................ H04L 45/00
                                                       370/228
2001/0009031 A1  7/2001  Nitta et al.
(Continued)

OTHER PUBLICATIONS

Combined Search and Examination Report for GB1803048.6 dated Aug. 24, 2018, 8 pages.
(Continued)

*Primary Examiner* — Jack Chiang
*Assistant Examiner* — Brandon Bowers
(74) *Attorney, Agent, or Firm* — Nixon & Vanderhye P.C.

(57) ABSTRACT

A computer-method is provided for designing a router network to connect components of an integrated circuit, where the router network comprises a plurality of connected data routing elements. The method comprises generating an undirected graph to represent a mesh of candidate router elements, where the candidate data routing elements are positioned dependent on at least one characteristic of the integrated circuit. The undirected graph comprises a node to represent each candidate data routing element and an edge to represent each connection between the candidate data routing elements. A candidate router network generation process is then performed a plurality of times, where each performance of the candidate router network generation process comprises: generating a tree structure from a plurality of possible tree structures to interconnect the nodes of the undirected graph; for each node in the tree structure, computing a compactness index indicative of a path cost associated with connections to at least a subset of other nodes in the tree structure; for each component to be connected to the router network, identifying a set of available nodes within the tree structure and connecting the component to a selected node within that set taking account of the compactness index of the nodes within the set, to thereby establish a candidate router network; and computing a cost value for the candidate router network taking into account each pair of components that are to communicate with each other via the candidate router network. One of the candidate router network is then selected as the router network based on the computed cost value for each candidate router network.

23 Claims, 21 Drawing Sheets

Candidate Router Network

(56) References Cited

U.S. PATENT DOCUMENTS

| | | | |
|---|---|---|---|
| 2003/0079198 A1* | 4/2003 | Yamamoto | G06F 17/10 716/126 |
| 2005/0229137 A1 | 10/2005 | Ito | |
| 2012/0304136 A1* | 11/2012 | Ge | G06F 17/5068 716/108 |
| 2013/0086534 A1 | 4/2013 | Zhao et al. | |
| 2013/0086544 A1 | 4/2013 | Alpert et al. | |

OTHER PUBLICATIONS

Peyer et al., "A generalization of Dijkstra's Shortest Path Algorithm with Applications to VLSI Routing", *Journal of Discrete Algorithms*, Dec. 2009, 24 pages.

Sepasi, "A Heuristic Algorithm for Automated Routing in Integrated Circuits", University of British Columbia, Oct. 2003, 80 pages.

Mukherjee et al., "Low Power Low Latency Floorplan-aware Path Synthesis in Application-Specific Network-on-Chip Design", Integration, the VLSI journal, Mar. 2017, 22 pages.

\* cited by examiner

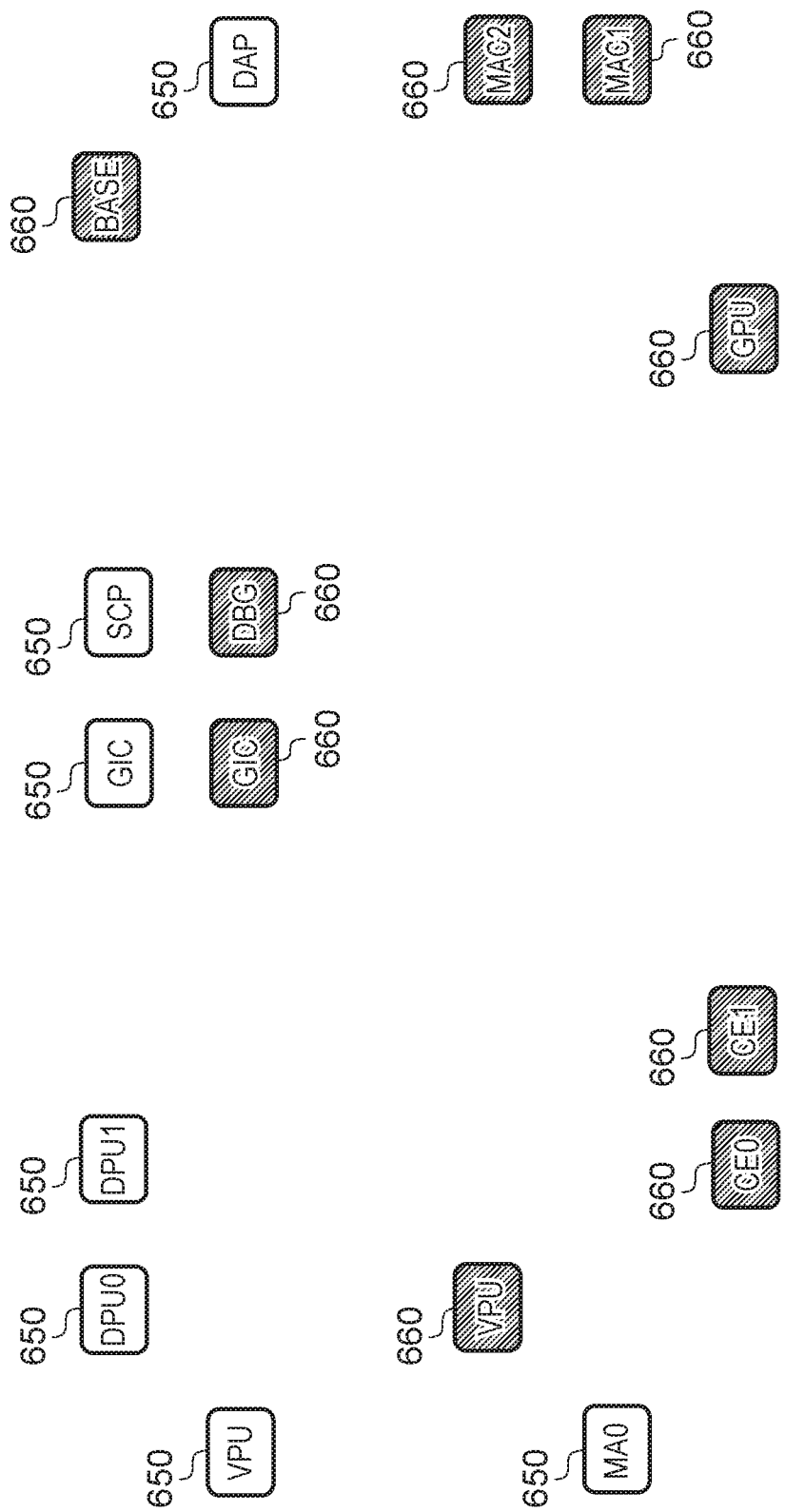
FIG. 7A Initial Bridge Positions

Undirected Graph

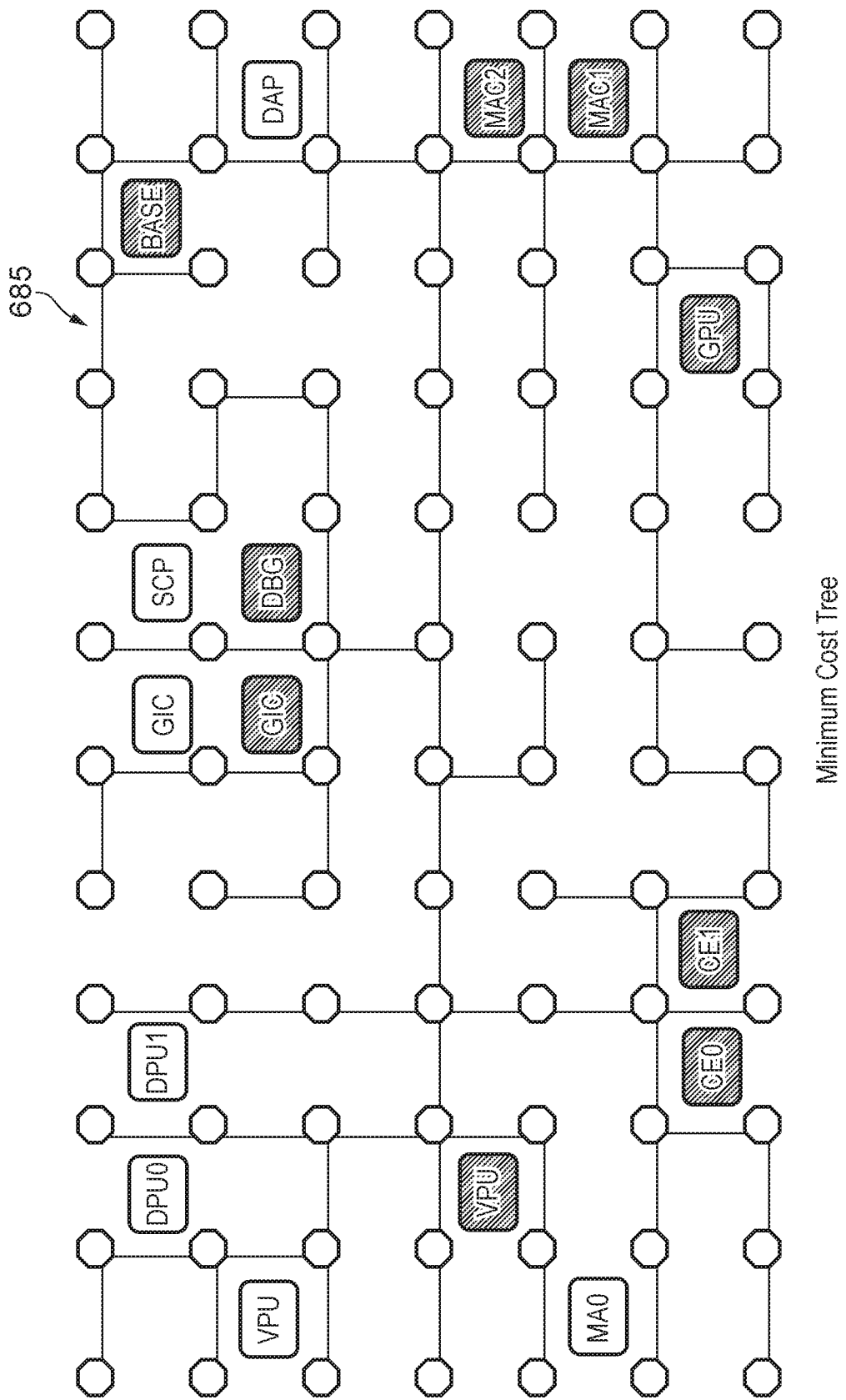
FIG. 7E  Minimum Cost Tree

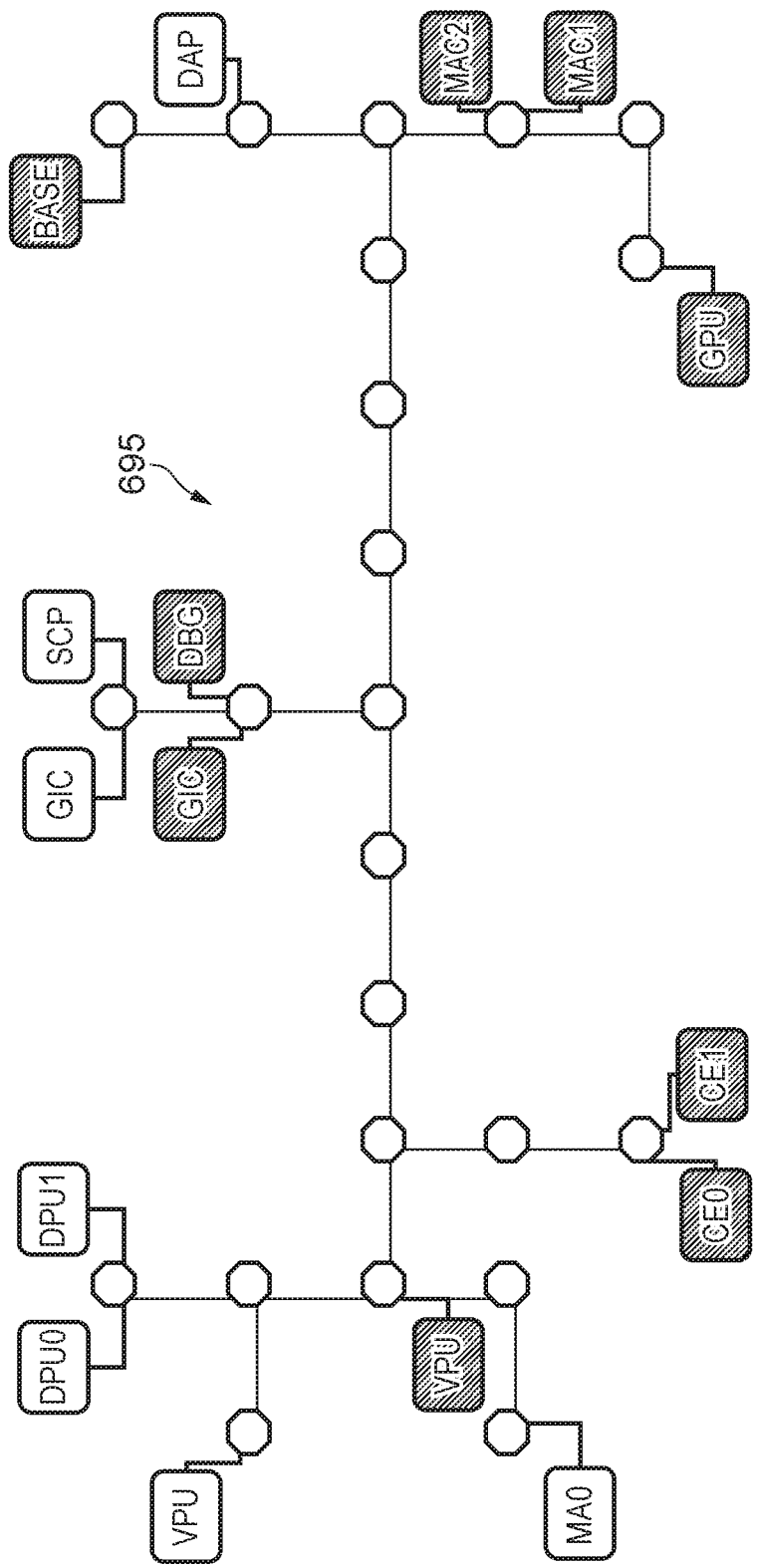
FIG. 7G  Candidate Router Network

Bridge Ports connected to Router [with least CI]

Candidate Router Network

INTEGRATED CIRCUIT DESIGN

This application claims priority to GB Patent Application No. 1803048.6 filed Feb. 26, 2018, the entire contents of which are hereby incorporated by reference.

BACKGROUND

This disclosure relates to integrated circuit design, and in particular to the design of interconnect structures for interconnecting multiple components of the integrated circuit.

Many different types of component can be interconnected via an interconnect structure within an integrated circuit, to enable communications to take place between those components. Further, the data propagated between the components via the interconnect can take a wide variety of different forms, and indeed the data itself may be subjected to some processing steps whilst being routed through the interconnect. An interconnect can include a number of different elements but one of the key elements within the interconnect are the data routing elements. In particular, multiple data routing elements will be connected together to form a router network through the interconnect, the router network being configured so that any particular component being connected to the interconnect can route data to any other component connected to the interconnect that it is required to communicate with. Some data routing elements may perform pure routing functions, whilst others may additionally perform one or more processing operations on the data being routed through them.

Due to the data routing elements providing the core functionality of the interconnect, then a key step in seeking to achieve an efficient interconnect design is to provide a design for the router network of data routing elements that allows for efficient routing of data between the components connected to the interconnect. However, in modern data processing systems, where a significant number of components may be connected to the interconnect, and the individual data routing elements may provide multiple connection options (due to their multi-ported design), there are a very large number of options for configuring a router network, and it would be desirable to provide a technique that could reliably determine an efficient router network design for a desired integrated circuit.

SUMMARY

In one example arrangement, there is provided a computer-implemented method of designing a router network to connect components of an integrated circuit, where the router network comprises a plurality of connected data routing elements, the method comprising performing the following steps on a computer: generating an undirected graph to represent a mesh of candidate data routing elements, the candidate data routing elements being positioned dependent on at least one characteristic of the integrated circuit, and the undirected graph comprising a node to represent each candidate data routing element and an edge to represent each connection between the candidate data routing elements; performing a candidate router network generation process a plurality of times, each performance of the candidate router network generation process comprising: generating a tree structure from a plurality of possible tree structures to interconnect the nodes of the undirected graph; for each node in the tree structure, computing a compactness index indicative of a path cost associated with connections to at least a subset of other nodes in the tree structure; for each component to be connected to the router network, identifying a set of available nodes within the tree structure and connecting the component to a selected node within that set taking account of the compactness index of the nodes within the set, to thereby establish a candidate router network; and computing a cost value for the candidate router network taking into account each pair of components that are to communicate with each other via the candidate router network; and selecting, as the router network, one of the candidate router networks based on the computed cost value for each candidate router network.

In another example arrangement there is provided an integrated circuit having an integrated circuit design incorporating a router network produced by the method set out above.

In a yet further example arrangement, there is provided a computer program product comprising a non-transitory machine-readable storage medium on which are stored program instructions which, when executed by the computer processor, cause the computer processor to perform a method of designing a router network to connect components of an integrated circuit, where the router network comprises a plurality of connected data routing elements, the method comprising: generating an undirected graph to represent a mesh of candidate data routing elements, the candidate data routing elements being positioned dependent on at least one characteristic of the integrated circuit, and the undirected graph comprising a node to represent each candidate data routing element and an edge to represent each connection between the candidate data routing elements; performing a candidate router network generation process a plurality of times, each performance of the candidate router network generation process comprising: generating a tree structure from a plurality of possible tree structures to interconnect the nodes of the undirected graph; for each node in the tree structure, computing a compactness index indicative of a path cost associated with connections to at least a subset of other nodes in the tree structure; for each component to be connected to the router network, identifying a set of available nodes within the tree structure and connecting the component to a selected node within that set taking account of the compactness index of the nodes within the set, to thereby establish a candidate router network; and computing a cost value for the candidate router network taking into account each pair of components that are to communicate with each other via the candidate router network; and selecting, as the router network, one of the candidate router networks based on the computed cost value for each candidate router network.

BRIEF DESCRIPTION OF THE DRAWINGS

The present technique will be described further, by way of illustration only, with reference to examples thereof as illustrated in the accompanying drawings, in which:

FIGS. 7A to 7I illustrate various stages within the router network design process for a particular arrangement of components to be interconnected;

DESCRIPTION OF EXAMPLES

Figure 1:
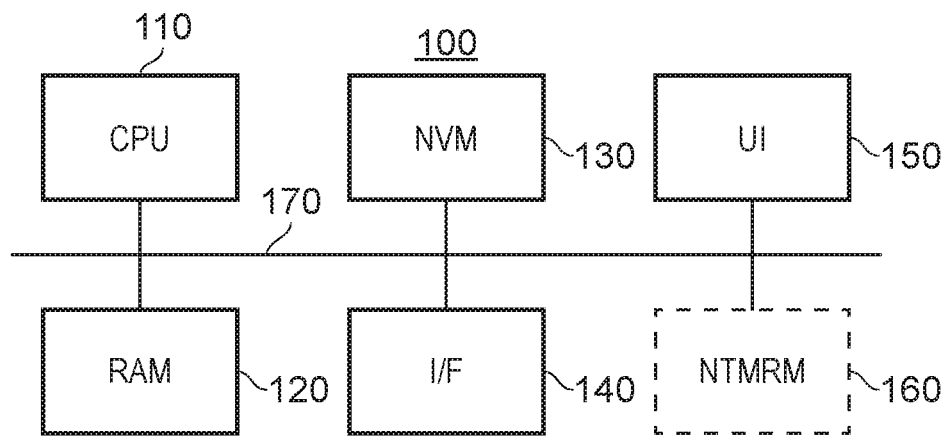
FIG. 1 schematically illustrates an example computer system.

In accordance with the described examples, a computer-implemented method is provided for designing a router network to connect components of an integrated circuit. The router network comprises a plurality of connected data routing elements. As mentioned earlier, the data routing elements may in some example arrangements solely perform data routing functions, but in other example arrangements one or more of the data routing elements may incorporate additional functionality in addition to the data routing functionality, for example to perform some processing on the input data in order to generate the output data propagated from that data routing element.

The components to be interconnected by the router network can take a wide variety of different forms depending on the type of integrated circuit, but generally some of the components will act as master devices whilst others will act as slave devices. Whilst the individual components may be discrete units, such as a central processing unit, a graphics processing unit, an interrupt controller, a memory access unit, etc, in some instances at least one component to be connected into the router network may itself be a network of units, with that network having an interface into the router network.

The method of the described examples involves generating an undirected graph to represent a mesh of candidate data routing elements, the candidate data routing elements being positioned dependent on at least one characteristic of the integrated circuit. Purely by way of example, the mesh of candidate data routing elements may seek to place the individual data routing elements at a maximum physical distance relative to each other that would avoid the need for an intermediate buffering element such as a register. Such a determination may be based for example on characteristics of the integrated circuit such as the process technology to be used to manufacture the integrated circuit, and physical dimension information of the components within the integrated circuit that may influence the distance a signal can travel in one clock cycle.

The undirected graph is produced so as to comprise a node to represent each candidate data routing element, and an edge to represent each connection between the candidate data routing elements.

Once the undirected graph has been generated, then a candidate router network generation process is performed multiple times. The number of times may be fixed, or alternatively may be programmable, but the aim is to repeat the process a sufficient number of times to enable an efficient solution for the router network to be found. The number of times that the process is iterated may vary depending on implementation. However, in practice it has been found that running the process of the order of a hundred times is often enough to ensure that a good quality solution is obtained.

Each performance of the candidate router network generation process comprises: generating a tree structure from a plurality of possible tree structures to interconnect the nodes of the undirected graph; for each node in the tree structure, computing a compactness index indicative of a path cost associated with connections to at least a subset of other nodes in the tree structure; for each component to be connected to the router network, identifying a set of available nodes within the tree structure and connecting the component to a selected node within that set taking account of the compactness index of the nodes within the set, to thereby establish a candidate router network; and computing a cost value for the candidate router network taking into account each pair of components that are to communicate with each other via the candidate router network.

Based on the cost values computed for the candidate router networks, one of the candidate router networks can then be selected as the output router network from the design process.

In one example arrangement, the cost values for the various candidate router networks can be maintained, and then after the candidate router network generation process has been performed the desired number of times, one of the router networks can be selected.

However, in one example arrangement, each performance of the candidate router network generation process further comprises applying an acceptance algorithm to determine whether to accept the candidate router network as a current best router network. The selecting step then comprises selecting, as the router network, the current best router network that exists after the candidate router network generation process has been performed the plurality of times. Hence, on each iteration of the candidate router network generation process, a determination as to the current best router network is performed, and then once the candidate router network generation process has been performed the desired plurality of times, the selected router network is then merely the current best router network identified at that point.

There are a number of ways in which the tree structure can be generated from the undirected graph when performing an iteration of the candidate router network generation process. In one example arrangement, the step of generating the tree structure comprises applying a selection policy to select a number k of edges, and removing the selected edges provided the graph remains unsplit, in order to produce a modified undirected graph. The tree structure is then generated from the modified undirected graph. By removing a number of edges, this creates a hunting space for the generation of a tree structure from the undirected graph. It is desired that the graph remains unsplit, as otherwise this would result in disjoint graphs, and the aim is to generate a tree structure that will enable all nodes to communicate with each other. Accordingly, if an edge is selected by the selection policy that would cause disjoint graphs to be created if that edge were removed, then in one example arrangement that edge is ignored, and in particular is not removed.

The selection policy can apply a number of criteria in order to determine which edges to select. For example, it could in one arrangement apply a random selection policy, so that the edges are selected entirely randomly. However, alternatively the selection probability could be biased with various factors, such as whether the edge has been selected previously or not, the type of traffic that would be propagated over the edge, etc.

There a number of ways in which the tree structure can be generated from the modified undirected graph. However, in one approach a tree generation algorithm is employed to generate, as the tree structure, a minimum cost tree for the modified undirected graph, such a minimum cost tree connecting all of the nodes in a way that utilises the minimum cost in terms of the edges used. The minimum cost tree generated will not typically be unique but provides one solution of tree that enables any node to connect to any other node.

There are a number of minimum cost tree algorithms that can be used, but in one example an algorithm is employed that produces, as the minimum cost tree, a Steiner tree.

When employing the tree generation algorithm, each of the edges within the modified undirected graph can be given an equal weighting. However, alternatively the tree generation algorithm may take into account a weighting associated with at least one edge within the undirected graph. The weighting to be applied to individual edges can be determined based on a variety of factors. For example, it can take into account information about the traffic that would need to be routed across the corresponding connection in the final router design, and hence apply some weighting based on factors such as bandwidth or burstiness of the traffic, how critical the traffic is (i.e. any latency requirements), quality of service (QoS) factors, etc.

Once the tree structure has been generated, then the process determines the compactness index for each node in the tree structure. In one example, the step of computing the compactness index for a chosen node comprises implementing a path determination algorithm to determine an optimal path through the tree structure between the chosen node and each other node in the tree structure, producing a path cost indication for each determined optimal path, and accumulating the path cost indications to produce the compactness index.

The optimal path can be chosen taking into account a variety of factors, but in one example will be the shortest path through the tree between the chosen node and each other node in the tree structure. Each such optimal path will traverse one or more edges through the tree structure, and cost information associated with each edge may be used to produce the path cost indication for that optimal path. Path cost information can take a variety of forms, and could for example be a path length indication. In a simple case, each edge may be considered to have the same length, and the path cost indication for each determined optimal path is determined by accumulating the path lengths of the various edges. However, in more complex systems, other information can be taken into account when determining the path cost, such as weightings applied to particular edges to take into account traffic to be routed over those edges. The weighting can be applied in a variety of ways, but in one example could involve producing a weighted path length for the various edges, so that those weighted path lengths are then accumulated to determine the path cost indication for any determined optimal path. The path cost indications for each determined optimal path are then accumulated in order to produce the compactness index for the node.

There are a number of path determination algorithms that can be used to determine optimal paths through the tree structure between any pair of nodes. For example, a breadth-first search (BFS) algorithm could be employed, or alternatively Dijkstra's algorithm could be employed. However, it will be appreciated that these are merely two examples of suitable path determination algorithms that could be used, and any other suitable path determination algorithm could instead be used.

As mentioned earlier, once the compactness index has been computed for each node in the tree structure, then a set of available nodes within the tree structure are identified for each component to be connected to the router network. The nodes identified at this point for any particular component can be chosen in a variety of ways but in one example arrangement the step of identifying the set of available nodes for a chosen component comprises determining a set of nodes whose associated data routing elements surround the chosen component. This may for example involve identifying a quadrant of nodes that surround the interface between the component and the router network, the interface being for example a bridge provided at an input/output of the component.

Once the set of available nodes has been determined for any particular component, then the selected node to which that component is connected can be chosen in a variety of ways, but in one example is that node having the best compactness index amongst the nodes in the set whose associated data routing element has an available connection port. Hence, provided all the nodes in the set are associated with data routing elements having an available connection port then the node will be chosen that has the best compactness index. However, if the node with the best compactness index is associated with a data routing element that does not have an available connection port, then the node will be chosen that has the next best compactness index, assuming that node is associated with a data routing element that has an available connection port.

Once the components have been connected to their selected nodes, at that point a candidate router network has effectively been established, since the tree structure will then provide a path between each component and each other component. Any nodes and edges within the tree structure that are then unused by the paths defined between the various components can at this point be logically ignored, since those nodes and edges are not needed in the final router network design for the particular candidate router network currently being considered.

A cost value is then computed for the candidate router network taking into account each pair of components that are to communicate with each other via the candidate router network. The step of computing the cost value may comprise determining the route through the candidate router network between each pair of components that are to communicate with each other via the candidate router network, producing a route cost indication for each determined route taking into account each edge provided within the determined route, and accumulating the route cost indications in order to produce the cost value. Hence, again cost information associated with the individual edges can be used, and in particular the individual edge cost indications can be accumulated in order to produce a route cost indication for each determined route. As with the computation earlier of the compactness index, the cost information can be set out in a variety of ways, and could for example be a path length indication such that the route cost indication effectively indicates a path length indication for the route. As with the earlier discussion, the edge costs may be weighted if desired to take into account information about the traffic to be passed over the associated connection in the candidate router network.

In one optional approach, when producing the route cost indication for a determined route, an edge within the determined route is excluded when that edge has already been accounted for in the route cost indication produced for one of the other determined routes. Whilst it is not necessary to do this, it has been found that this can provide a more informative overall cost value for comparison with equivalent cost values of other candidate router networks.

As mentioned earlier, in one example arrangement, each performance of the candidate router network generation process may further involve applying an acceptance algorithm to determine whether to accept the candidate router network as a current best router network. In one example arrangement, the acceptance algorithm determines that the candidate router network is to be accepted as a new current best router network when the cost value for the candidate router network indicates that the candidate router network is a lower cost solution that an existing current best router network. Hence, considering the earlier example where the cost is expressed in terms of path length, then if the overall path length indication for the candidate router network is less than that of any currently determined best router network, then the acceptance algorithm may determine that the current candidate router network should be chosen to be the new current best router network.

In one example arrangement, the acceptance algorithm can be arranged such that in some instances it will cause the candidate router network to be selected as the new current best router network even if it is a higher cost solution. In particular, where it is intended to repeat the candidate router network generation process a significant number of times, then always selecting the lower cost solution, particularly early on in the number of iterations, can lead to the algorithm finding a local minima within the cost function and this may not be representative of an optimum router network, where instead it is desirable to seek to find a global minima within the cost function.

Accordingly, in one arrangement the acceptance algorithm is arranged in certain instances to accept the candidate router network as the new current best router network even though the cost value for the candidate router network indicates that the candidate router network is a higher cost solution that the existing current best router network. Hence, purely by way of example, if the current candidate router network has a cost value that is slightly higher than the cost value of the current best router network, but within a certain chosen range of that cost value, then the acceptance algorithm may choose to accept the candidate router network as the new current best router network even though its cost value is slightly higher.

The way in which the acceptance algorithm determines whether to accept higher cost solutions can be kept the same throughout the multiple iterations of the candidate router network generation process. However, in an alternative arrangement that mechanism can be weighted so that it is more likely to select higher cost solutions earlier in the process than later in the process. As such, the probability of the acceptance algorithm accepting the candidate router network as the new current best router network even when it is a higher cost solution than the existing current best router network may decrease as the number of iterations of the candidate router network generation process increases.

As mentioned earlier, the undirected graph generated at the initial stage in the process represents a mesh of candidate data router elements, and in particular comprises a node to present each candidate data router element and an edge to represent each connection between the candidate data routing elements. When generating the mesh of candidate data routing elements, factors such as manufacturing process technology and physical dimension information may be used in order to determine the separation between the candidate data routing elements. In addition, in one example arrangement the step of generating the mesh of candidate data routing elements further comprises deleting candidate data routing elements from any unrouteable areas within the integrated circuit, and/or deleting candidate data routing elements that overlap with locations of the components within the integrated circuit. As a result, it will be apparent that the mesh of candidate data routing elements will not necessarily be a symmetrical array of candidate data routing elements, and that there may be some spaces where no candidate data routing elements are present.

Particular examples will now be described with reference to the Figures.

The following examples of the present disclosure relate to a method performed by a computer or data processing system such as a computer processor. FIG. 1 is a schematic diagram of an example computer apparatus appropriate to the performance of such a method.

Referring to FIG. 1, various components are shown schematically, interconnected by a bus arrangement 170. Other components may also be provided even if they are not shown (for clarity of the diagram and explanation) in FIG. 1.

The example computer 100 comprises: a central processing unit (CPU) 110, a random access memory (RAM) 120, a non-volatile memory (NVM) 130 such as a hard disk drive, an interface (I/F) 140 for connecting to other components such as peripheral devices, a network connection, the internet and so on, a user interface (UI) 150 providing, for example, a keyboard, mouse, display or the like, and a non-transitory machine readable medium (NTMRM) 160 such as a magnetic or optical disk, a flash memory or other non-volatile memory or the like.

In example arrangements, the NTMRM 160 can embody a computer program product comprising the NTMRM 160 on which are stored program instructions which, when executed by the computer processor 110 of the computer 100, cause the computer processor to perform a method of the type described below, such as the method of FIGS. 5A and 5B to be discussed below.

Example arrangements relate to the design, by a computer system, of a router network for an integrated circuit device such as a so-called network on chip (NoC), although the design of router networks for other types of integrated circuit is also envisaged within the scope of the present disclosure.

A NoC represents a system of interconnected processing devices or other devices embodied on a single integrated circuit. An example schematic representation of a NoC 310 is provided as FIG. 2. Here, multiple so-called IP blocks 300 are connected to one another to provide a network of such blocks. In this example, an "IP block" is a unit of circuitry with particular functionality, which typically (though not necessarily) represents the intellectual property or IP of a single party. Commonly, in integrated circuit design, these so-called IP blocks are treated as units within the integrated circuit design process, even though an IP block may comprise very many gates, transistors or other components in its own right. The term "IP block" is used here in a generic illustrative sense; the IP blocks 300 are simply functional blocks with the capability of communicating data with other such functional blocks. Their precise function is a matter of system design and is not relevant to the communication arrangements which will be discussed in more detail below. Similarly, although the term "IP block" implies ownership of rights in the module design, the present disclosure is not limited to any particular ownership arrangement.

Figure 2:
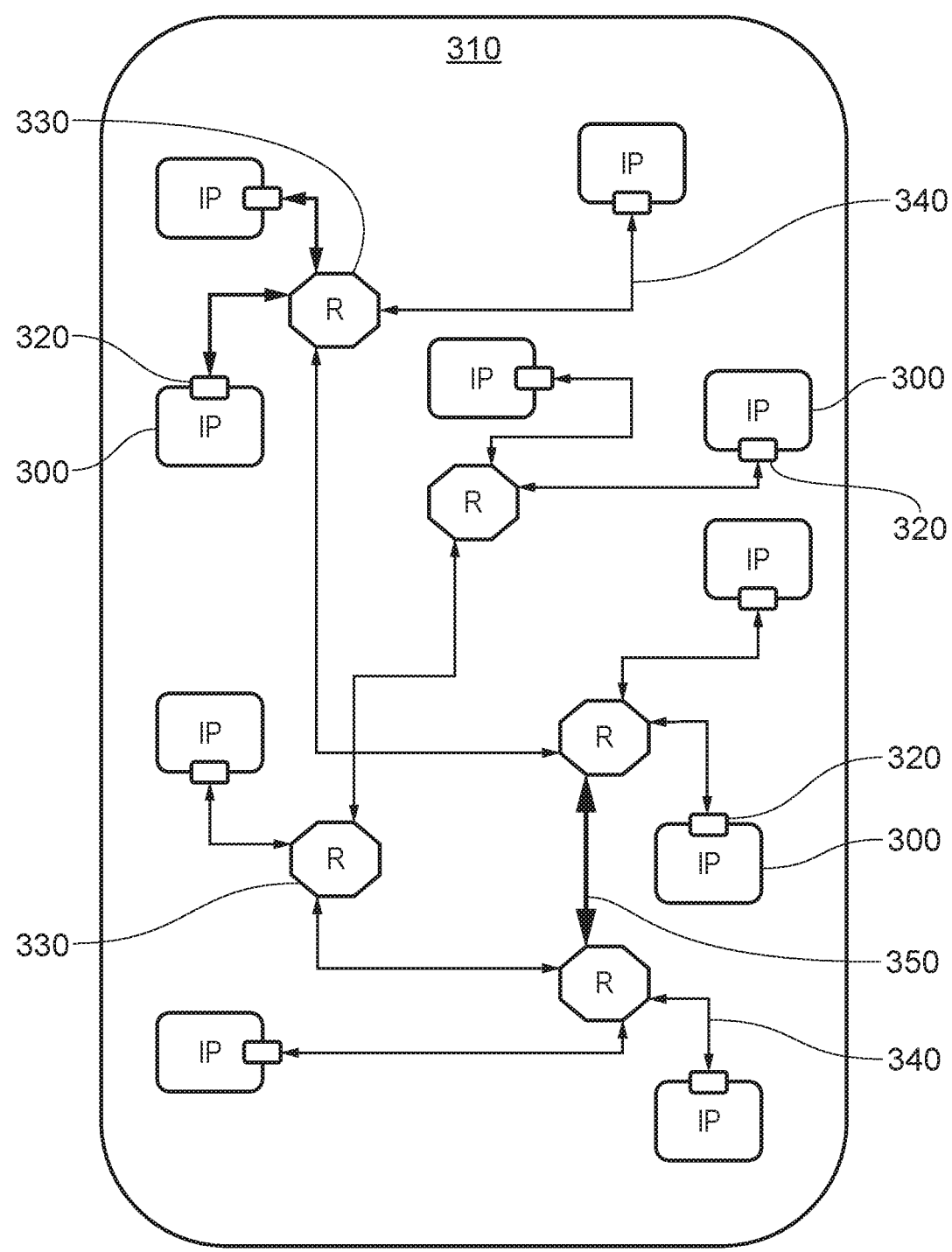
FIG. 2 schematically illustrates a Network on Chip (NoC)

So, for the purposes of FIG. 2, it is sufficient to note that the IP blocks 300 are capable of communicating with other IP blocks 300 within the NoC 310.

Communication between IP blocks may be according to so-called virtual channels (VCs). Virtual channels assign a respective time slot (in a time division multiplexed arrangement) or (in other examples) an identifier to packets being transmitted via a physical connection between two data handling nodes, so as to allow multiple communication paths (such as paths in each direction) to use that physical connection in such a way that packets associated with different VCs do not collide or otherwise interfere with one another.

Each IP block comprises a bridge 320 at an input/output of the IP block. The purpose of the bridge is as follows. In general terms, within a NoC such as the schematic NoC 310, data is transferred in packetized form, for example as so-called flits (flow control units). The routing and transmission of the flits is under the control of various interconnected routers (R) 330 provided within a router network, and as will be discussed in more detail later the present disclosure provides a technique that may be used to design a suitable router network to be used to interconnect the bridges of the various IP blocks. The data transport mechanism used by the routers 330 and connections such as connections 340 between the routers and the IP blocks is generic, which is to say the same protocol is used regardless of the nature of the IP blocks 300 forming the NoC 310. In other words, the transport protocol is "agnostic" to the nature or design of the individual IP blocks. The bridges 320 convert a particular IP block's data protocol (which may not be necessarily a packetized protocol) into the generic transport protocol used by the network connections 340 and the routers 330. Similarly, for packets or flits received from the network, the bridges 320 convert the generic transport protocol of the network into the specific data input requirements of the respective IP block.

So, a particular bridge is specific to its associated IP block in terms of its interface with that IP block, but it generic to the network in terms of its interface with the network.

The routers 330 in FIG. 2 are shown schematically as octagonal blocks, which schematically represents the fact they are 8-port routers. However, other numbers of router ports could be provided. The routers could all have a similar design, or different types of routers could be used within a single NoC.

A data link 350 is drawn schematically using a wider or thicker line than other data links in the schematic representation of FIG. 2. This is to provide a schematic representation of a wider data link, which is to say that more conductors are provided so that the data link 350 can carry more data in parallel than other narrower data links of FIG. 2. This could represent a greater capacity of that data link in terms of bits per second transferred, if the data link 350 runs at the same clock speed as other, narrower, data links in FIG. 2. Alternatively, the clock speed of the data link 350 could be proportionately slower so that although more physical wires are used for the data link 350, its transport capacity in bits per second is the same as that of other data links such as the data links 340. In general, the data transport capacity of each of the data links is dependent upon by its width multiplied by its operating clock speed.

In the example of FIG. 2, between any one of the IP blocks 300 and any other one of the IP blocks 300, there is only one valid data transfer route. The routing is statically determined at the integrated circuit design stage. If the interconnection of routers 330 provides multiple potential data transport routes, a particular route between a first and a second IP block is selected and established statically in advance rather than being allocated dynamically in use. This provides a safer mode of operation avoiding potential deadlocks or other hazardous situations which might occur if the routing of data packets was selectable in operation. So, regardless of how many potential connections there are between a particular IP block pair of one IP block and another, the data will be routed by a pre-selected one of those connection routes.

Figure 3:
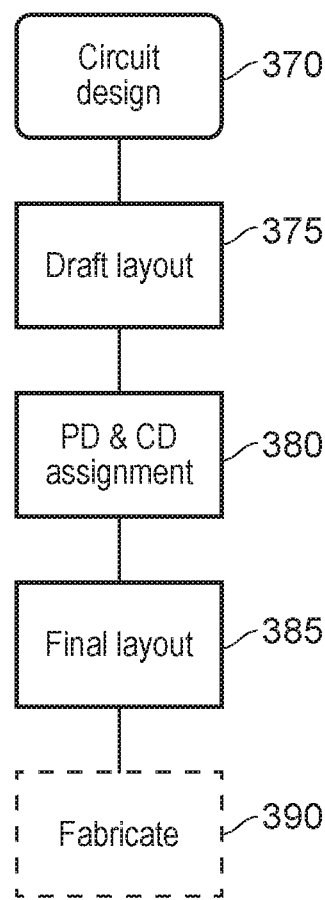
FIG. 3 is a schematic flowchart illustrating a method of integrated circuit design.

Referring to FIG. 3, the schematic diagram of FIG. 2 represents an example of a circuit design 370 forming an input to an integrated circuit design process implemented by a computer. As will be discussed in more detail later, the router network design process can be employed during step 370 in order to determine a suitable router network to be used to interconnect the various IP blocks of the NoC.

At a step 375, the computer processor generates a draft physical layout of the integrated circuit, using known techniques and involving selecting physical locations on an integrated circuit substrate for the various components of the integrated circuit according to parameters such as proximity to power supply rails and clock supply connectors, proximity to other components to which as physical connection is required, avoiding crosstalk of other unwanted interaction between conductors, and the like. The draft physical layout may include one or more other components (examples of so-called non-routing nodes) such as pipeline registers (data buffers) and serdes (serializer/deserializer nodes) providing a data path between a pair of ports and which will be discussed in more detail with reference to FIG. 4 below.

At a step 380, the computer processor allocates or assigns a power domain (PD) and clock domain (CD) to each of the router devices. Then, at a step 385 the computer processor generates a final layout in which transitions between clock domains and/or power domains are handled by using so-called PCDC (power clock domain crossing) circuits. This provides a power and clock domain conversion node at each circuit position at which a power and clock domain conversion is (detected by the step 380 to be) required.

The production of the final layout at the step 385 represents the end of the process carried out by the computer processor, but at a further optional step 390, an integrated circuit is fabricated (by fabrication machinery) according to the finalised layout. The particular details of the fabrication process are not discussed further here. However, it is noted that the step 390 provides an example of generating an integrated circuit layout according to the integrated circuit design. Such an integrated circuit, having an integrated circuit design produced by the method defined above is also considered as an embodiment of the present disclosure.

Figure 4:
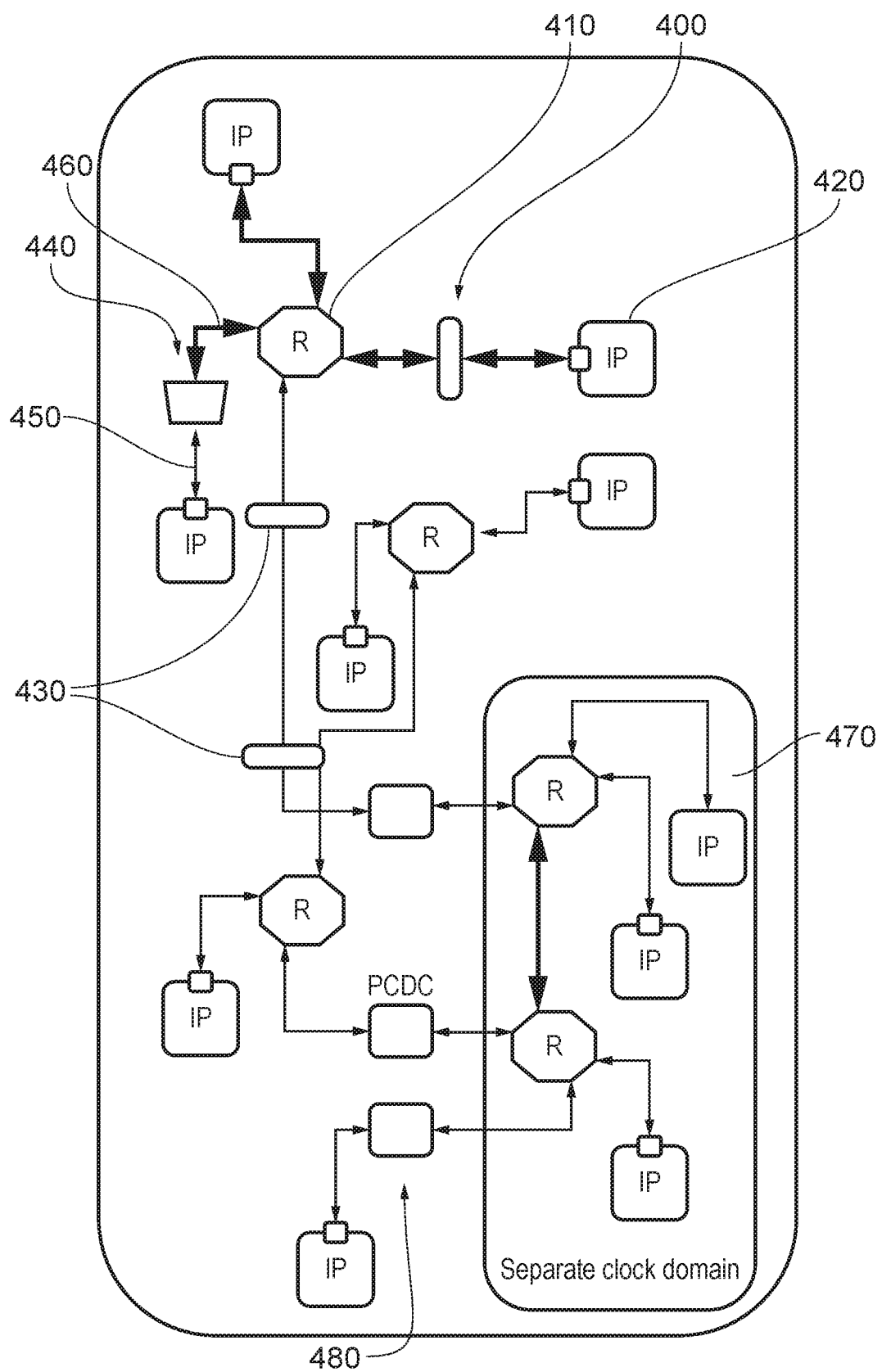
FIG. 4 schematically illustrates a NoC.

Turning to FIG. 4, the diagram does not necessarily directly represent a draft or final layout but does represent the further components and other factors introduced into such a layout, for the purposes of illustration.

A pipeline register 400 or data buffer is introduced where a length or distance of conductor between one component such as a router 410 and an IP block 420 is so long that transmission along that conductor would potentially cause issues if it were attempted to be carried out within a single clock cycle. So, by placing the pipeline register (or in the example case of pipeline registers 430, more than one pipeline register) along that conductor path, the transit between the components 410, 420 can be split into multiple partial transits, in respective clock cycles. For example, data can be transferred from the router 410 to the pipeline register 400 in a first clock cycle and then, in a next or subsequent clock cycle, from the pipeline register 400 to the IP block 420.

Serdes 440 are used to transition between data connections such as connections 450, 460 of different widths. Here, as discussed above, the width may refer to the number of conductors, or in other words the quantity of data which can be conveyed in parallel. In the example shown, the data path 450 has a narrower width than the data path 460. So, in the case of transmission of a packet on the (wider) data path 460 from the router 410 to the serdes 440, the data packet is received and buffered by the serdes 440 and then output as multiple successive packets on the narrower data connection 450. Similarly, an incoming packet on the data connection 450 is buffered at the serdes 440 and can be aggregated with other incoming packets to form a suitably wider packet for transmission on the data connection 460. In general terms, serdes are used to manage transitions between data connections of different widths.

The IP blocks or other components such as routers operate in various power domains and clock domains. In FIG. 4, just two clock domains are shown, one for a circuitry region 470 and one for the remainder of the NoC. However, multiple power domains and clock domains can be provided. At an interface between two different domains, a so-called PCDC circuit, for example implemented as an asynchronous FIFO, is provided. Examples of PCDC circuits 480 are shown in FIG. 4 at transitions between the clock domain 470 and the remainder of the NoC of FIG. 4.

As mentioned earlier, in order to produce an efficient overall design for the NoC, it is important at the design stage 370 of FIG. 3 to determine an efficient design for the router network formed by a plurality of connected data routing elements and used to enable data to be routed between the various IP blocks. By way of specific example, FIG. 2 discussed earlier illustrates one specific example design of router network consisting of the routing elements 330 interconnected via the various paths shown. However, it will be appreciated that that is not the only router arrangement that could be produced, and indeed there will typically be a very large number of possible router network designs that could be developed. The computer implemented method that will now be described with reference to the remaining figures seeks to provide an automated mechanism for determining an efficient router network design to be used within integrated circuits.

Figure 5A:
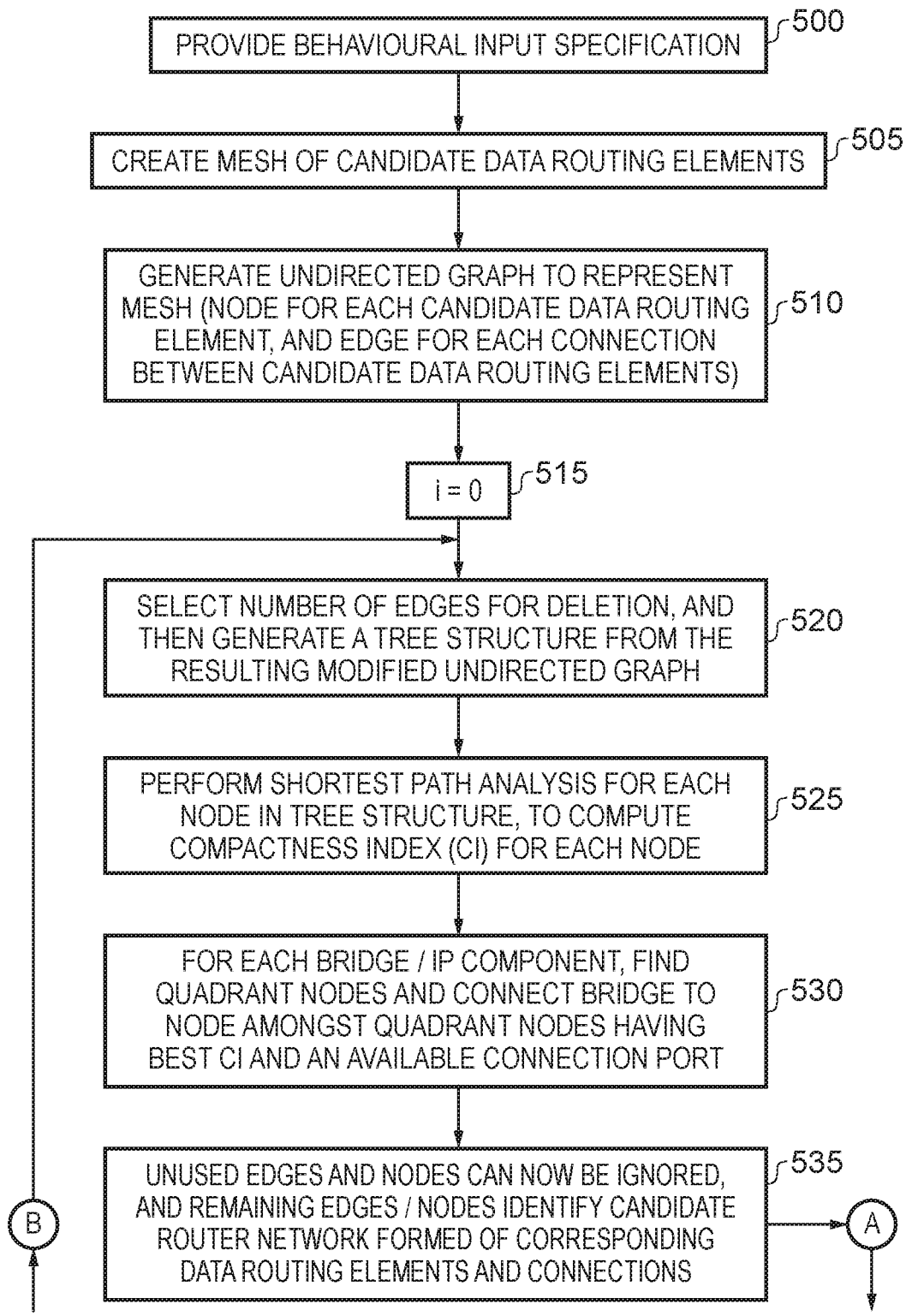
FIGS. 5A and 5B provide a flow diagram illustrating a method of designing a router network in accordance with one example arrangement.
Figure 5B:
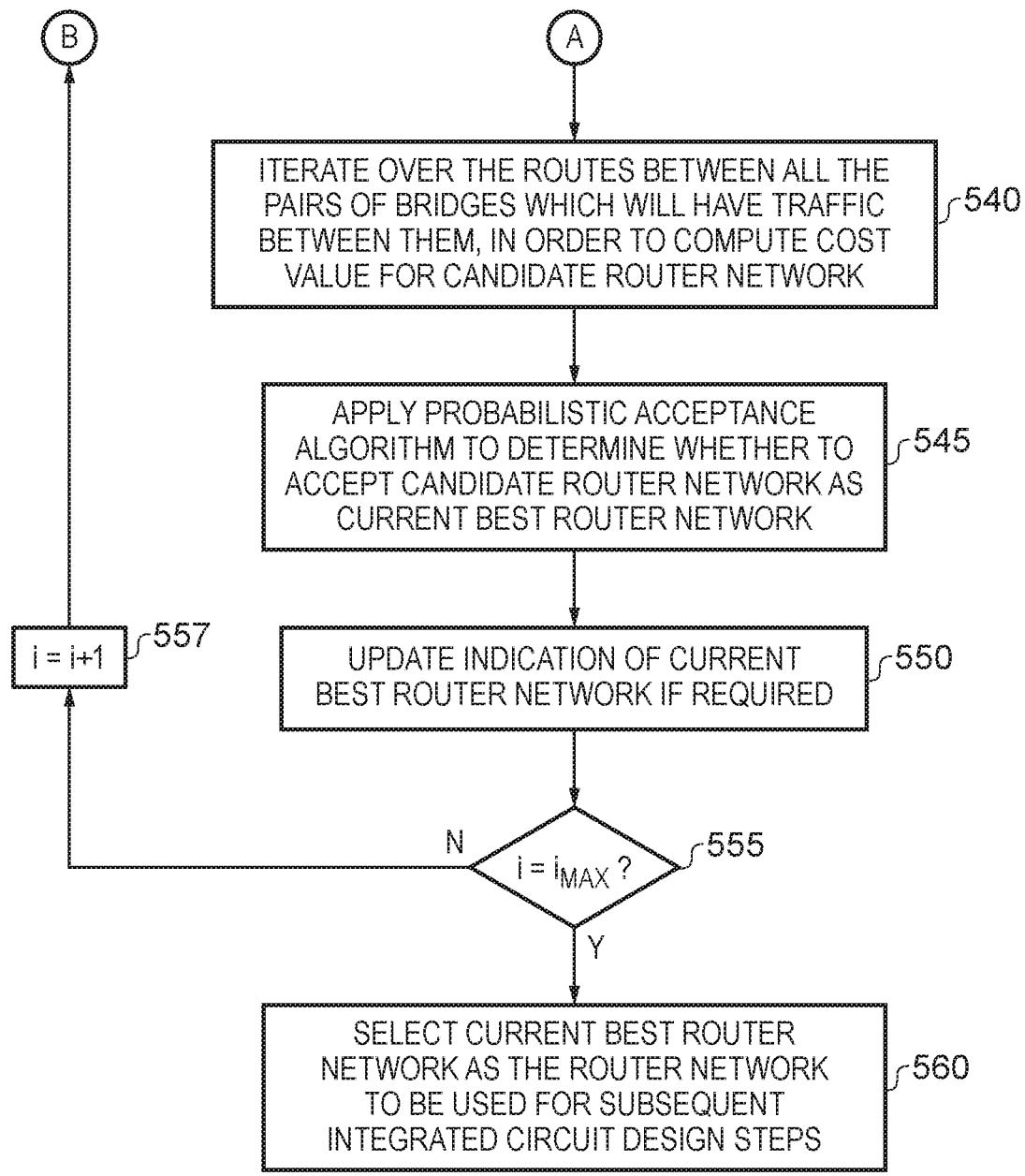

FIGS. 5A and 5B provide a flow diagram setting out the process that may be performed in one example. At step 500 a behavioural input specification for the integrated circuit is provided. This provides certain information about the desired integrated circuit, and can be used as a starting point for performing interconnect synthesis in order to lay out the various interconnect components and to configure them, so as to produce an integrated circuit design complying with the behavioural input specification. As part of this process, it is required to design a router network formed of a plurality of connected data routing elements that can be used to route data between the required IP blocks.

Figure 6:
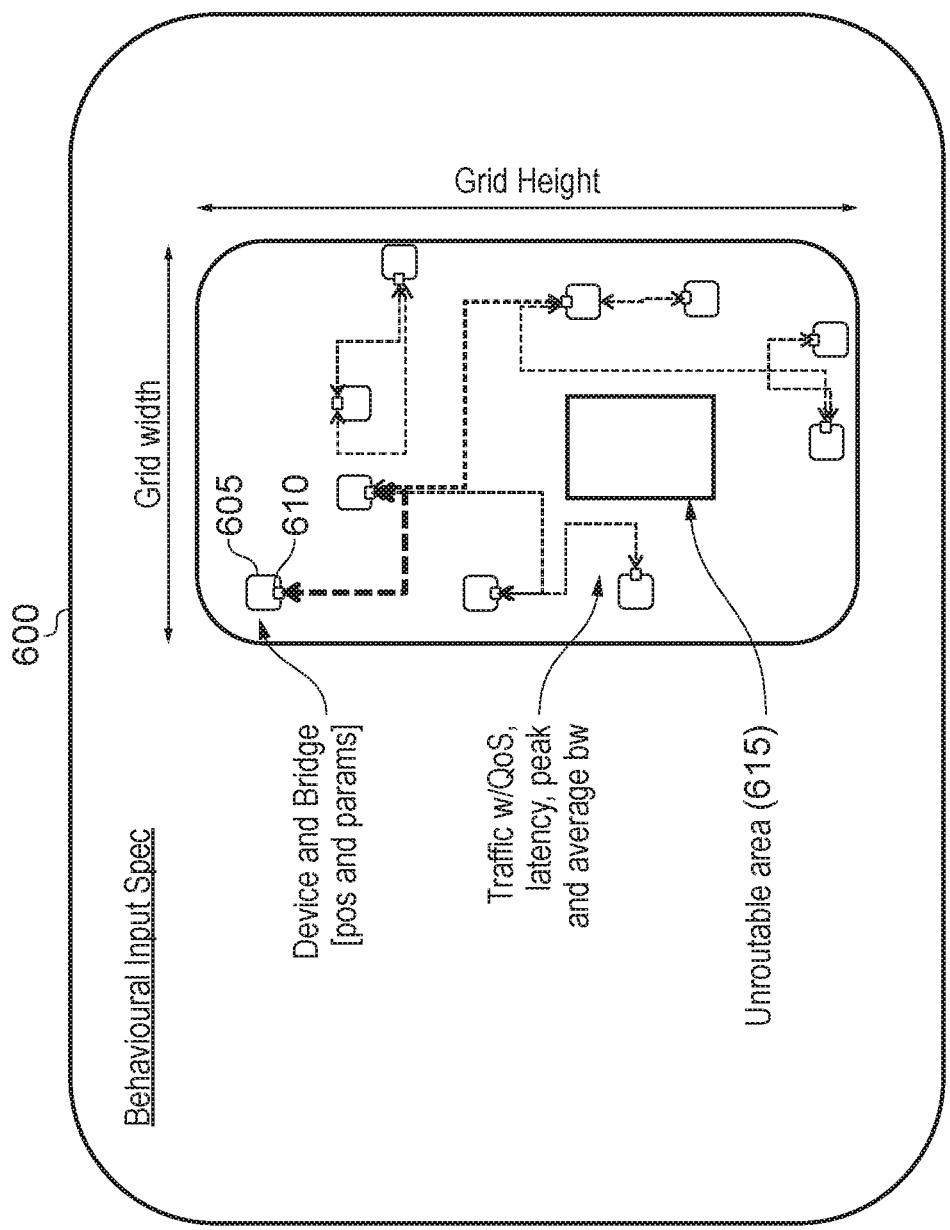
FIG. 6 illustrates a behavioural input specification that may be provided as a first step in the flow diagram of FIGS. 5A and 5B.

The behavioural input specification can take a variety of forms, and one form is illustrated schematically by the schematic representation 600 in FIG. 6. In particular, the behavioural input specification can identify the various IP blocks 605 and associated bridge components 610. It can also identify which IP blocks need to communicate with each other, and provide information about the traffic that needs to be passed between them. This traffic information can take a variety of forms, and hence for example may identify average and/or peak data rates, any latency request (hence effectively identifying relative importance of different types of traffic), QoS considerations, etc. With regards to the IP components and associated bridges, the information may identify the position and parameters of those components. It can also provide physical information about the integrated circuit, such as the grid height and the grid width, and in addition may for example identify different power domains to be used for certain components. It may also define certain topological constraints. This could for example involve identifying unrouteable areas such as the unrouteable area 615 shown in FIG. 6.

Figure 7B:
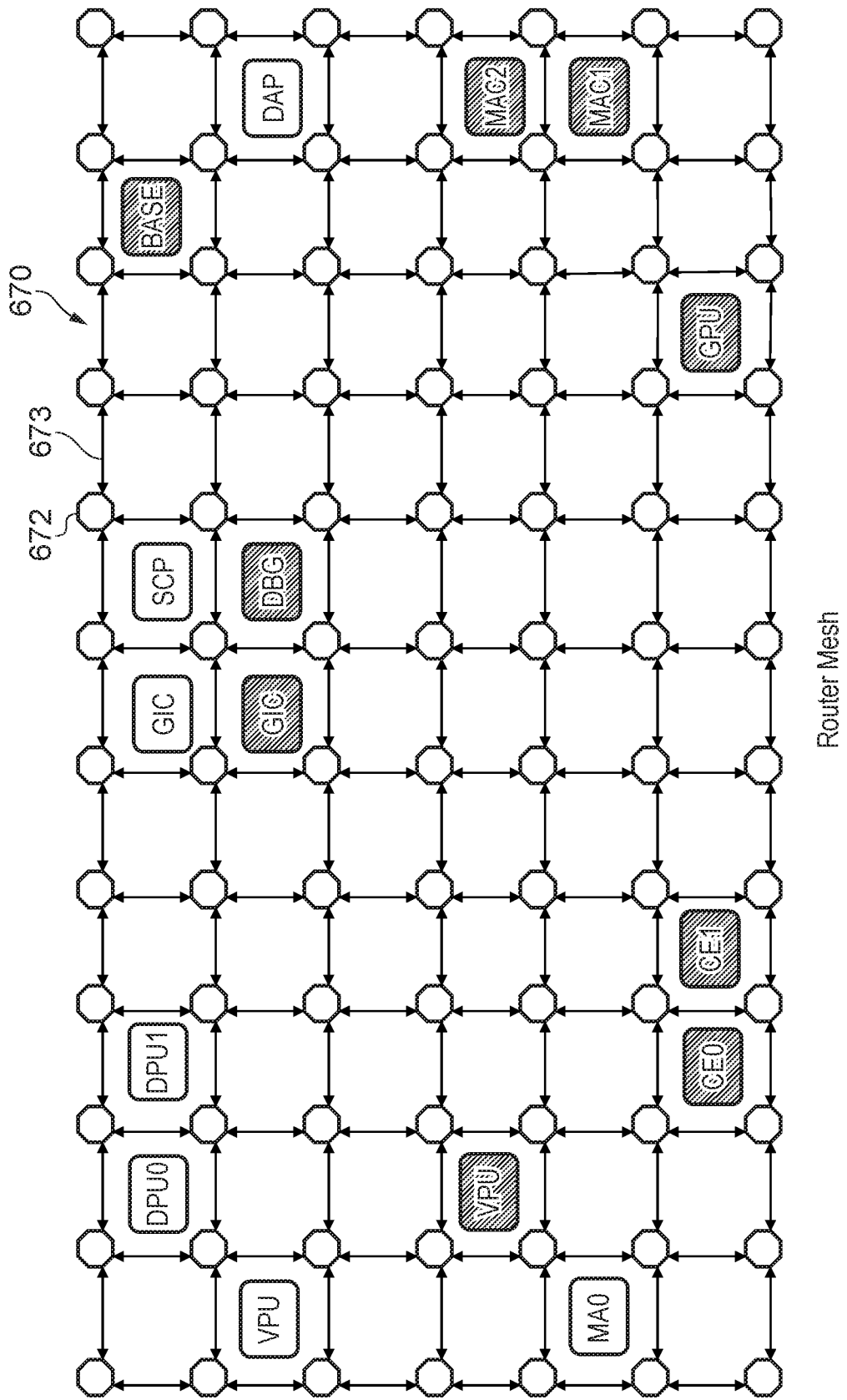

Once the behavioural input specification has been provided, then at step 505 a mesh of candidate data routing elements is created. This is illustrated schematically with reference to FIGS. 7A and 7B. In particular, FIG. 7A illustrates the initial bridge positions for the bridges associated with a variety of IP blocks. The IP blocks themselves can take a variety of forms, but in general terms there will be a number of master devices 650 and a number of slave devices 660.

As then shown in FIG. 7B, a router mesh can be created comprising a mesh 670 of candidate data routing elements 672 with associated connections 673. The physical distance by which the candidate data routing elements are separated can vary dependent on implementation, but in one example is a maximum physical distance that can be provided between the candidate data routing elements 672 without the need for an intervening buffering element such as a register. This distance can be determined for example based on information about the process technology used to manufacture the integrated circuit, and physical dimension information about the integrated circuit. Such information can be used to determine the distance a signal will be able to travel in a single clock cycle, and to compute the separating distance accordingly.

Figure 7C:
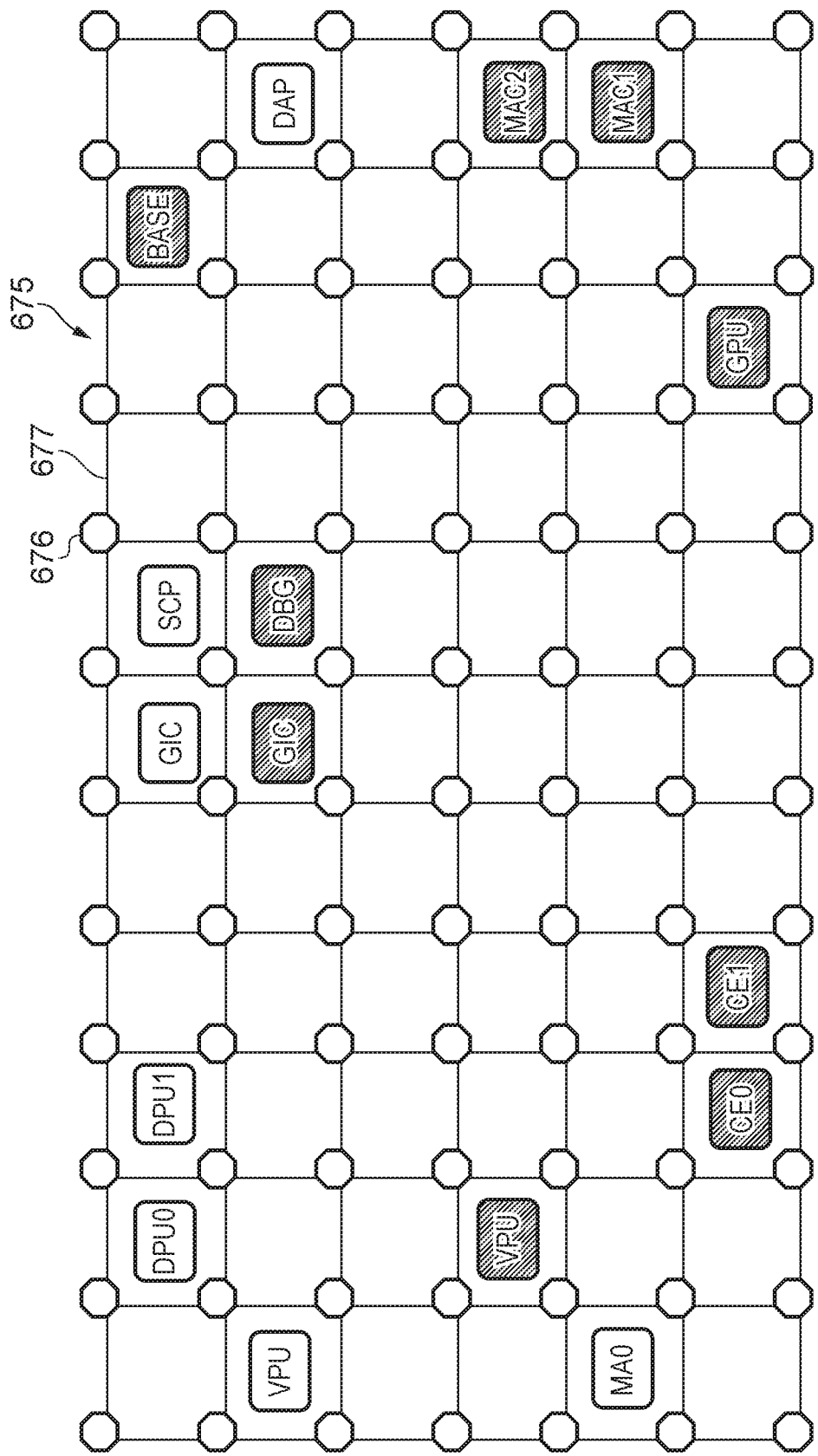

Following step 505 of FIG. 5A, the process proceeds to step 510 where an undirected graph is generated to represent the mesh, using a node to represent each candidate data routing element, and an edge to represent each connection between candidate data routing elements. Such an undirected graph is illustrated by the graph 675 shown in FIG. 7C. As can be seen, any two routers which are directly connected within the router mesh design have an undirected edge between them. As a result, the undirected graph comprises an array of nodes 676 interconnected by edges 677. In one example implementation, all of the edges are considered to have a constant weight, but in alternative arrangements certain edges can be allocated different weights, for example to take into account information about the traffic that that may need to propagate over those edges.

Once the undirected graph 675 has been created, then an iteration count i is set equal to zero at step 515, whereafter an iterative process is initiated, where each iteration of the process performs a candidate router network generation process comprising the sequence of steps 520 to 550 shown in FIGS. 5A and 5B.

Figure 7D:
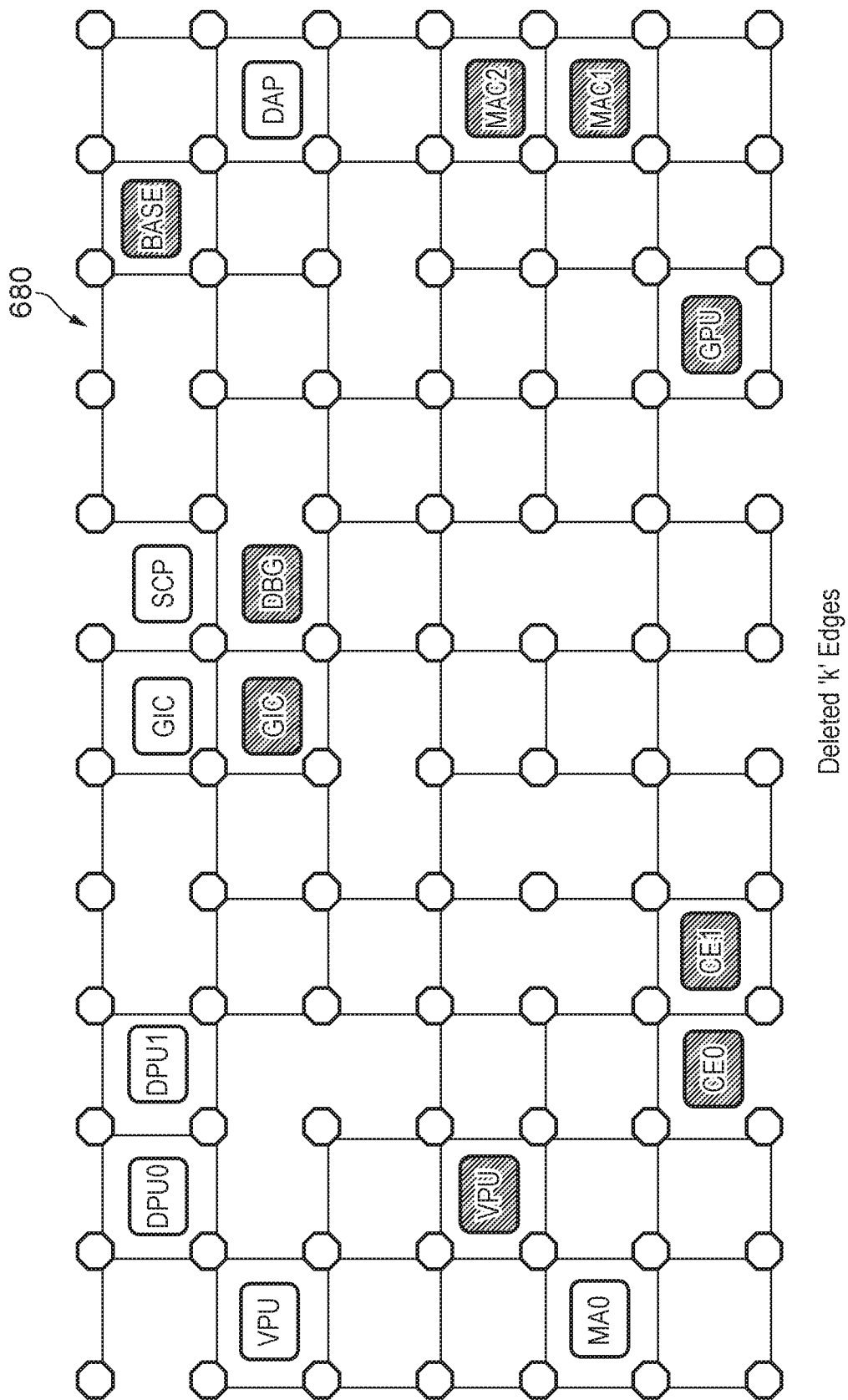

At step 520, a selection policy is applied to select a number k of edges to delete. This serves as a starting point for creating a tree structure from the undirected graph, by identifying a hunting space for application of a tree generation algorithm to generate a tree structure. FIG. 7D illustrates the resultant modified undirected graph 680 produced as a result of deleting k edges. The edges to delete can be chosen in a variety of ways. For example, they effectively may be chosen randomly if desired. Alternatively, the selection policy can take into account a variety of factors in order to affect the probability of particular edges being selected for deletion. For example, the selection probability may be biased to take into account whether an edge has been selected previously or not, what kind of traffic may be propagated over the connection associated with that edge (whether that traffic is critical traffic or not), etc.

In one embodiment, when deleting each of the selected edges, it is checked that deletion of that edge will not result in the graph becoming split i.e. for the graph to become multiple disjoint graphs. In particular, it is desired that any resultant tree structure will enable any node to communicate with any other node, and accordingly it is desired for the modified undirected graph to remain unsplit. If one of the selected edges is such that deleting that edge would result in disjoint graphs, then in accordance with one approach that edge is merely ignored, and in particular is not deleted.

Once the k edges have been deleted, then at step 520 a tree structure is generated from the resulting modified undirected graph. There are a number of known techniques for generating tree structures from undirected graphs. A number of tree generating algorithms can be used but in one example, as illustrated by way of example in FIG. 7E, a minimum cost tree generating algorithm is used so as to develop a minimum cost tree 685 from the undirected graph. It will be appreciated that for any modified undirected graph there will not be a single unique tree structure that could be produced. The way in which the minimum cost tree is produced can vary depending on implementation, but in one embodiment the tree generation algorithm is such that the minimum cost tree generated is a Steiner tree.

When applying the tree generation algorithm, each of the edges can be given an equal weight, or alternatively weighting can be associated with one or more of the edges, for example to take account of knowledge about the traffic that would be routed over those edges.

Once the tree structure has been produced at step 520, then at step 525 of FIG. 5A an optimal path analysis is performed for each node in the tree structure in order to compute a compactness index (CI) for each node. In one arrangement, the optimal path analysis is used to find the shortest path between each node and each other node in the tree structure, and based on those shortest paths a compactness index is then produced for that node. The computation of the compactness index will be discussed in more detail later with reference to the flow diagram of FIG. 8, but essentially serves to associate a numerical value with each node in the minimum cost tree, that can then be referred to when determining which node to connect each component to.

In particular, once the compactness index has been determined for each node, then at step 530, each bridge/IP component is considered and in particular a set of available nodes within the tree structure to which that component can connect is determined.

Figure 7F:
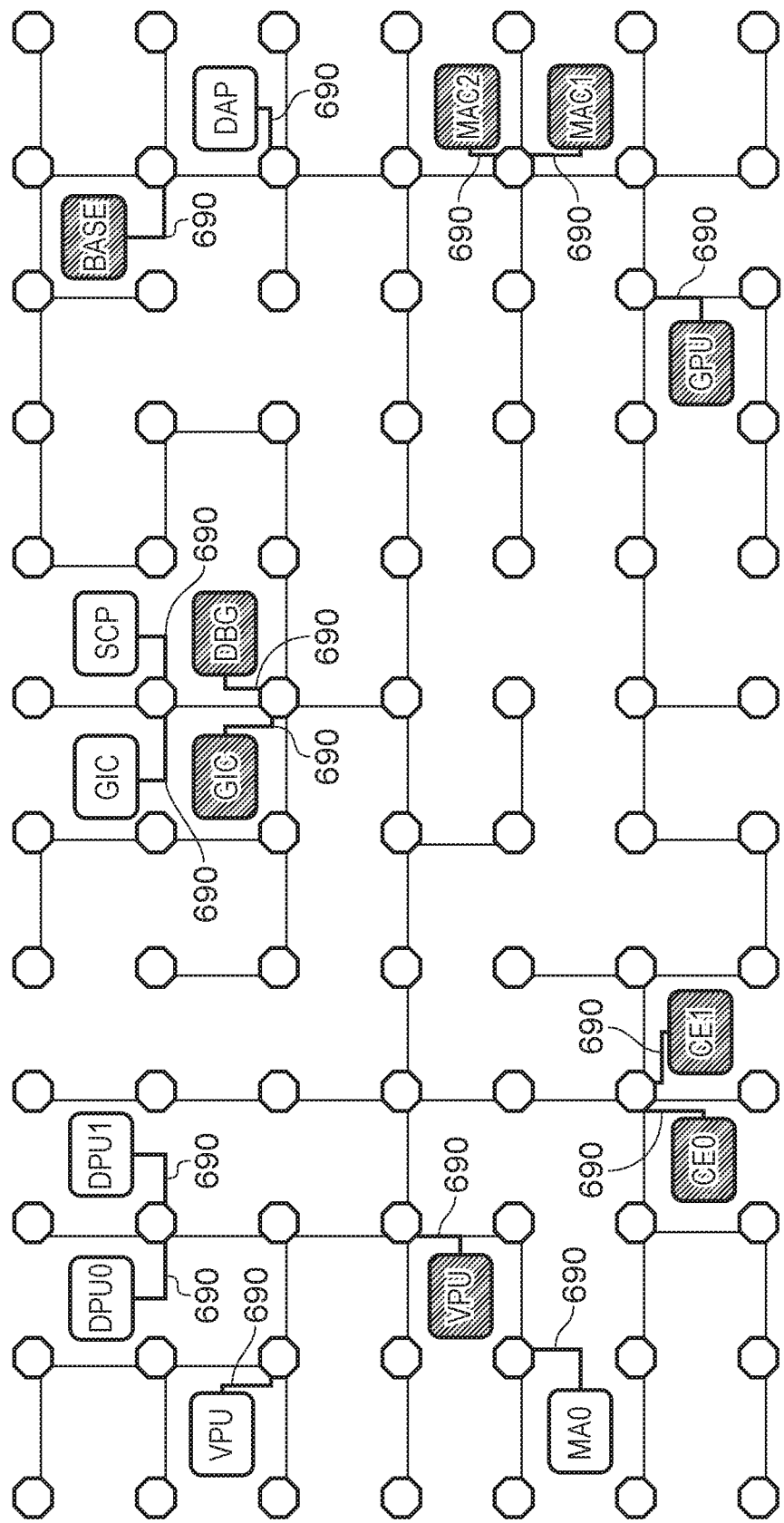

As illustrated by the example in FIG. 7F, there will typically be a quadrant of available nodes surrounding each bridge, and in principle the bridge could connect to any one of those four nodes. However, there will be a finite number of connection ports for a data routing element represented by each node, and a bridge can only connect to such a data routing element if there is an available connection port. However, whilst ensuring that that constraint is adhered to, at step 530 each bridge will be connected to the node amongst the identified quadrant of nodes that has the best compactness index, assuming there is a free connection port for the associated data routing element. In the example of CI that will be discussed later with reference to FIG. 9A, a lower numerical value of CI indicates a better CI and accordingly each bridge will be connected to the node amongst the identified quadrant of nodes that has the lowest value CI, assuming a connection port is available. FIG. 7F shows the resultant connections 690 that may be made as a result of applying step 530 of FIG. 5A.

As indicated by step 535, any unused edges and nodes that are left after step 530 has been performed can effectively be ignored, and the remaining edges and nodes identify a candidate router network formed of the corresponding data routing elements and connections. This is illustrated schematically in FIG. 7G assuming the connections shown in FIG. 7F are made between the bridges and nodes, where the resultant candidate router network 695 is shown.

However, whilst FIG. 7G illustrates the candidate router network 695, there is no requirement to actively delete the other nodes and edges at this point in the process, since those nodes and edges will in any case not be used during the remainder of the process applied to assess the cost of the candidate router network 695 shown in FIG. 7G.

At step 540 of FIG. 5B, the next stage in the candidate router network generation process is to compute a cost value for the candidate router network taking into account each pair of components that are to communicate with each other via the candidate router network. Accordingly, for each component 650, 660 shown in FIG. 7A, it will be determined which other components that component needs to communicate with via the candidate router network and then the route between that component and each of the other required components will be determined. This process will be discussed in more detail later with reference to the flow diagram of FIG. 10, but in essence a cost value is determined for each of the identified routes and then those cost values are accumulated in order to determine an overall cost associated with the candidate router network.

Thereafter, at step 545, a probabilistic algorithm is applied to determine whether to accept the candidate router network as the current best router network. During a first iteration through the process of steps 520 to 550, then the candidate router network will be selected as the best router network. However, on subsequent iterations, the probabilistic acceptance algorithm will make a decision based on the cost computed at step 540 for the current candidate router network and equivalent cost associated with the current best router network. This process will be discussed in more detail later with reference to the flow diagram of FIG. 11. However, in summary, if the current candidate router network is considered to be a lower cost solution than the current best router network, that candidate router network will then be chosen as the new current best router network. In addition, in one example arrangement, it is possible in some instances that the probabilistic acceptance algorithm may decide to select the current candidate router network as the new current best router network even though its cost is somewhat higher than the existing current best router network. In particular, by such an approach, it has been found that the iterative process set out in FIGS. 5A and 5B is more likely to find a global minima in the cost function.

At step 550, the indication of the current best router network is updated if required, i.e. if application of step 545 causes the current candidate router network to be chosen as the new current best router network.

Thereafter, at step 555, it is determined whether the iteration count i has reached a maximum number, and if not the value of i is incremented at step 557 and the process returns to step 520 to perform another iteration of the candidate router network generation process.

The maximum iteration count can be chosen based on a number of factors. However, the aim is to run the process for a long enough period that there is a high probability of the process finding a suitable low cost solution for the router network, ideally the global minima within the cost function. In practice, for the types of interconnect of interest, it is likely that running the loop between 100 and 1000 times will produce a good quality result, and often running the iteration for of the order of 100 times has been found to produce a good quality solution. In general, the maximum iteration count can be user defined, rather than being predetermined.

Once it is determined at step 555 that i is equal to $i_{max}$, then the process proceeds to 560 where the current best router network is selected as the router network to be used for subsequent integrated circuit design steps.

Returning to FIG. 7G, the candidate router network 695 chosen will be the most compact design with regards to the k edges that were deleted, and the specific minimum cost tree that was determined from the modified undirected graph. However, it will be appreciated that it will not necessarily be the best possible solution for the NoC as a whole, or even the best solution having regards to the k edges deleted. However, by iteratively performing the process described with reference to FIGS. 5A and 5B, the process can converge on an optimal router network solution.

Figure 7H:
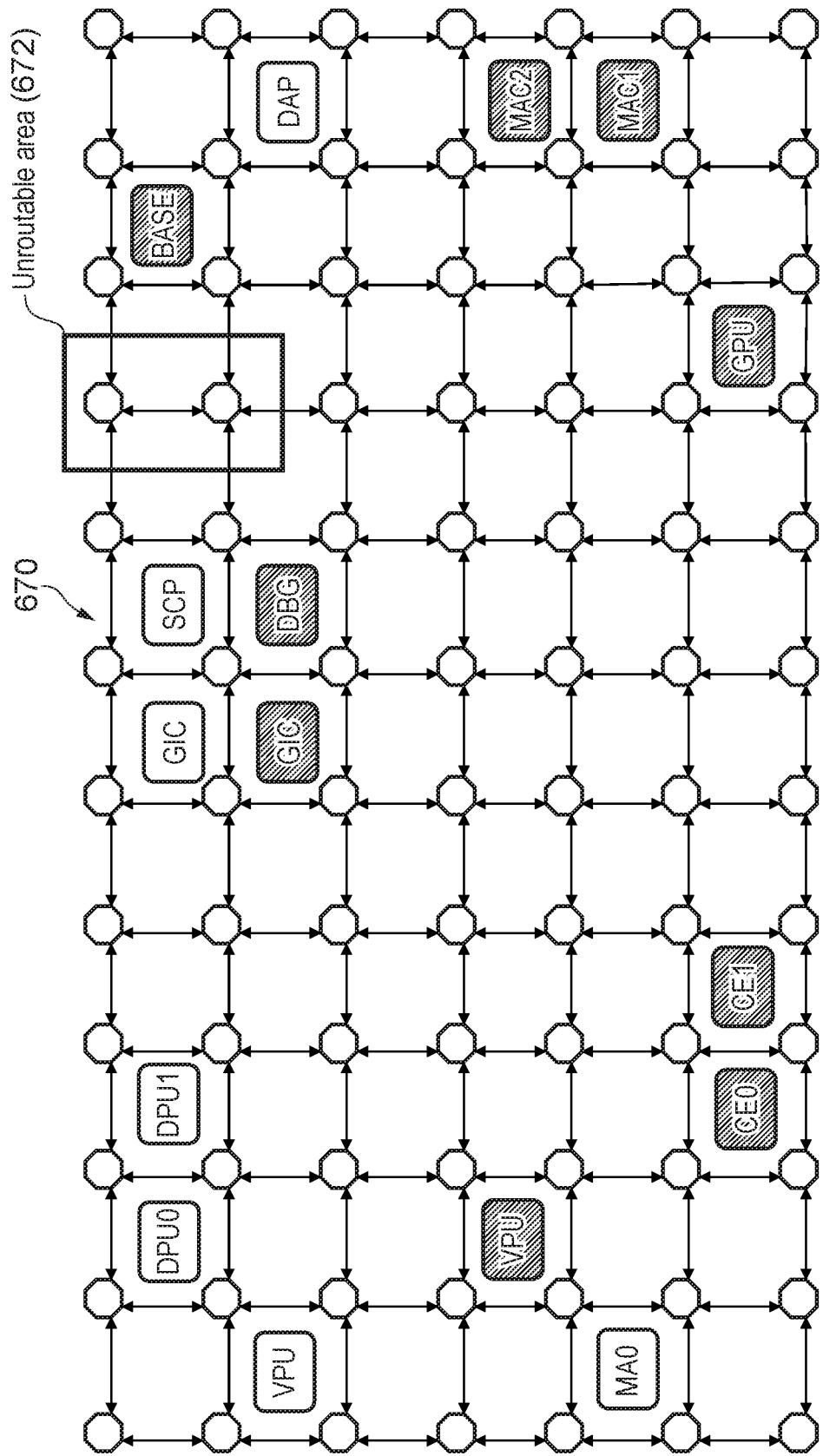
Figure 7I:
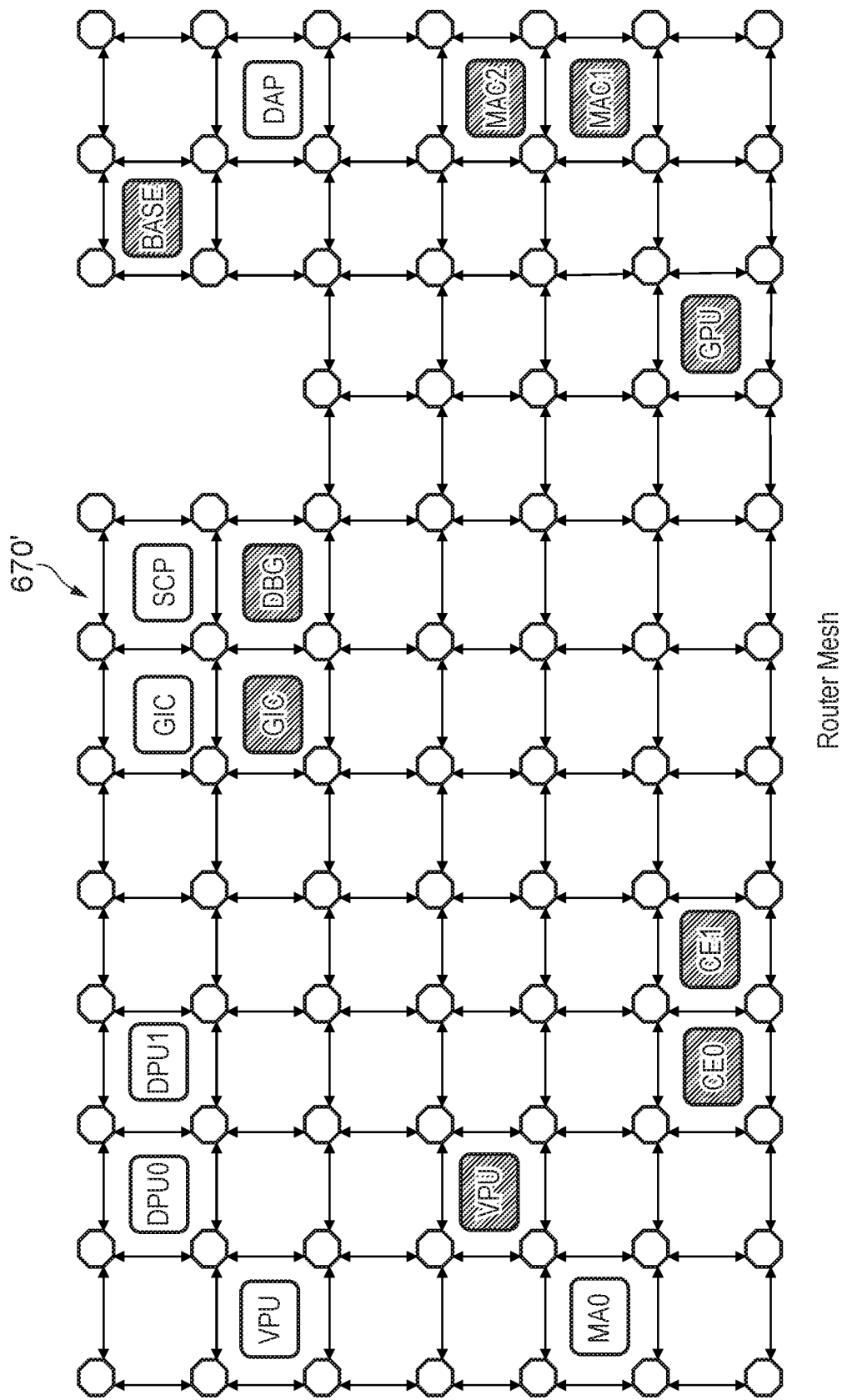

In the router mesh example discussed earlier with reference to FIG. 7B, it is assumed that a completely uniform array of candidate data router elements was produced. However, as illustrated by FIG. 7H, it is possible for unrouteable areas such as the unrouteable areas 672 to be identified by the behavioural input specification, and in that instance overlapping candidate data routing elements can be omitted from the mesh design, as illustrated by the modified mesh design 670' shown in FIG. 7I. A similar process can be performed to remove any candidate data routing elements that would overlap with the IP blocks themselves. Once the resultant routing mesh has been determined, then the undirected graph is produced as discussed earlier, by using a node to represent each candidate data routing element within the mesh, and an edge to represent each connection between the candidate data routing elements.

Figure 8:
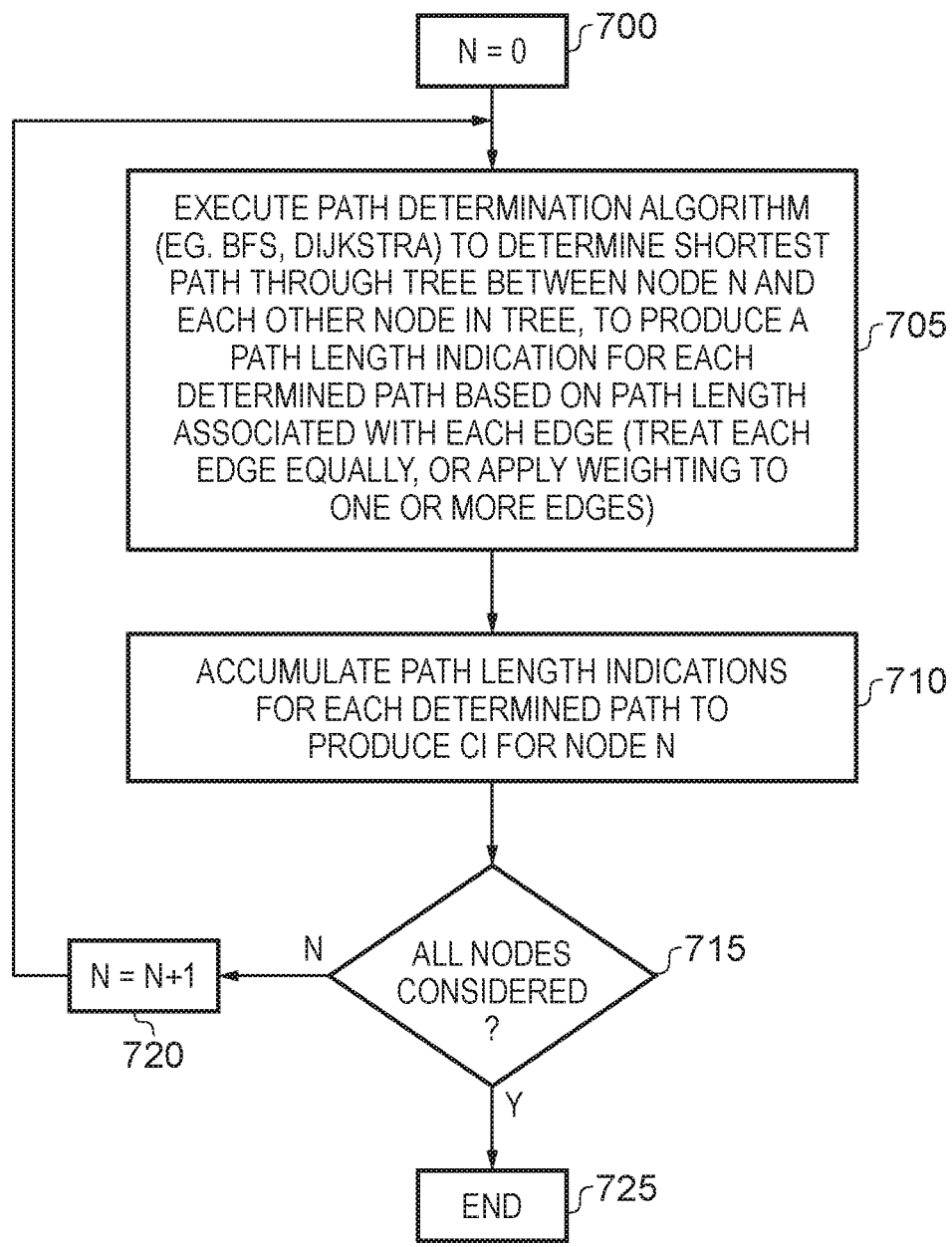
FIG. 8 is a flow diagram illustrating in more detail the steps in order to compute a compactness index for each node at step 525 of FIG. 5A.

FIG. 8 is a flow diagram illustrating the steps performed to compute the compactness index for each node at step 525 of FIG. 5A. At step 700 a parameter N is set equal to zero to identify a first node. At step 705, a path determination algorithm is then executed to determine optimal paths between node N and each other node in the tree and to then produce a path cost indication for each determined path. In the example illustrated, the algorithm that is executed seeks to determine the shortest path through the tree between node N and each of the other nodes. Further, the cost information is encoded in terms of path length, and accordingly a path length indication is produced for each determined path. In one example arrangement, each edge has a path length associated with it, and accordingly the path length indication for a determined path can be formed by adding together the path lengths for each of the edges along that path. Each of the edges can be treated equally, or alternatively a weighting can be applied to one or more of the edges. As such, the path length information can be weighted if desired, to represent the weighting applied to the various edges.

The path determination algorithm can take a variety of forms, but in one embodiment is an algorithm used to determine the shortest path on a tree, such as a breadth-first traversal (BSF) algorithm. Alternatively, Dijkstra's algorithm could be applied. It will be appreciated that these are just two examples of suitable algorithms that could be used, and any suitable algorithm could be used in order to determine the optimal path through the tree between one node and each other node.

At step 710, the path length indications for each of the determined paths is accumulated to produce the compactness index for node N. This process is illustrated schematically in FIG. 9A, which shows a minimum cost tree that has been computed for the example arrangement of components shown in FIG. 9A. The minimum cost tree 750 has a compactness index value associated with each node. In this example, each edge is assumed to have a path length of "1" and the compactness index value is formed by, for each node, determining the shortest path to each other node, producing a path length indication for that path, and then accumulating all of the path length indications. Hence, purely by way of example, for the node 752, the compactness index value is 40, assuming each edge has a length of 1, and taking into account the shortest paths from node 752 to each other node within the minimum cost tree 750.

Returning to FIG. 8, it is determined at step 715 whether all nodes have been considered, and if not the node identifier value N is incremented at step 720, whereafter the process returns to 705. Once it is determined at step 715 that all nodes have been considered, then the process ends at step 725.

Figure 9A:
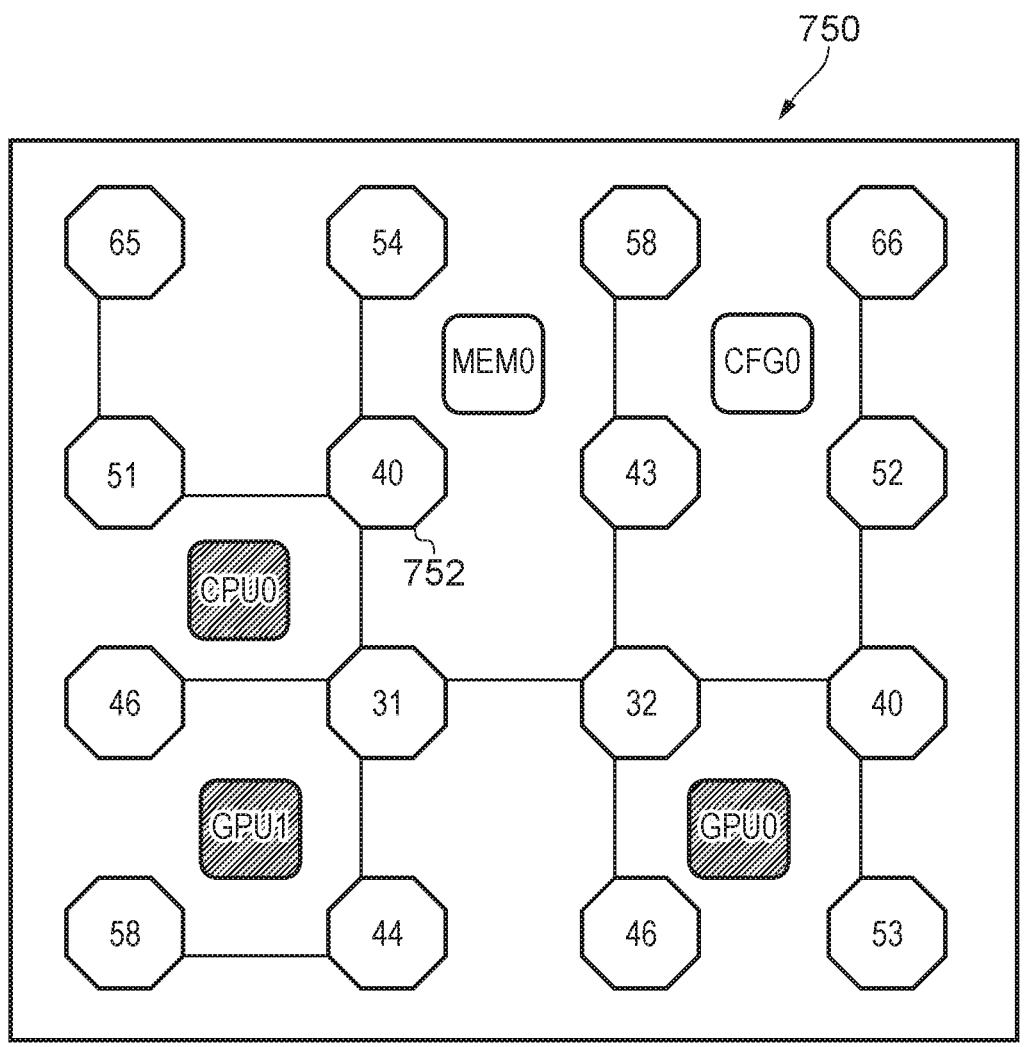
FIGS. 9A to 9C schematically illustrate how compactness index information can be used in order to decide which node to connect individual components to during the router network design process, for a particular example scenario.
Figure 9B:
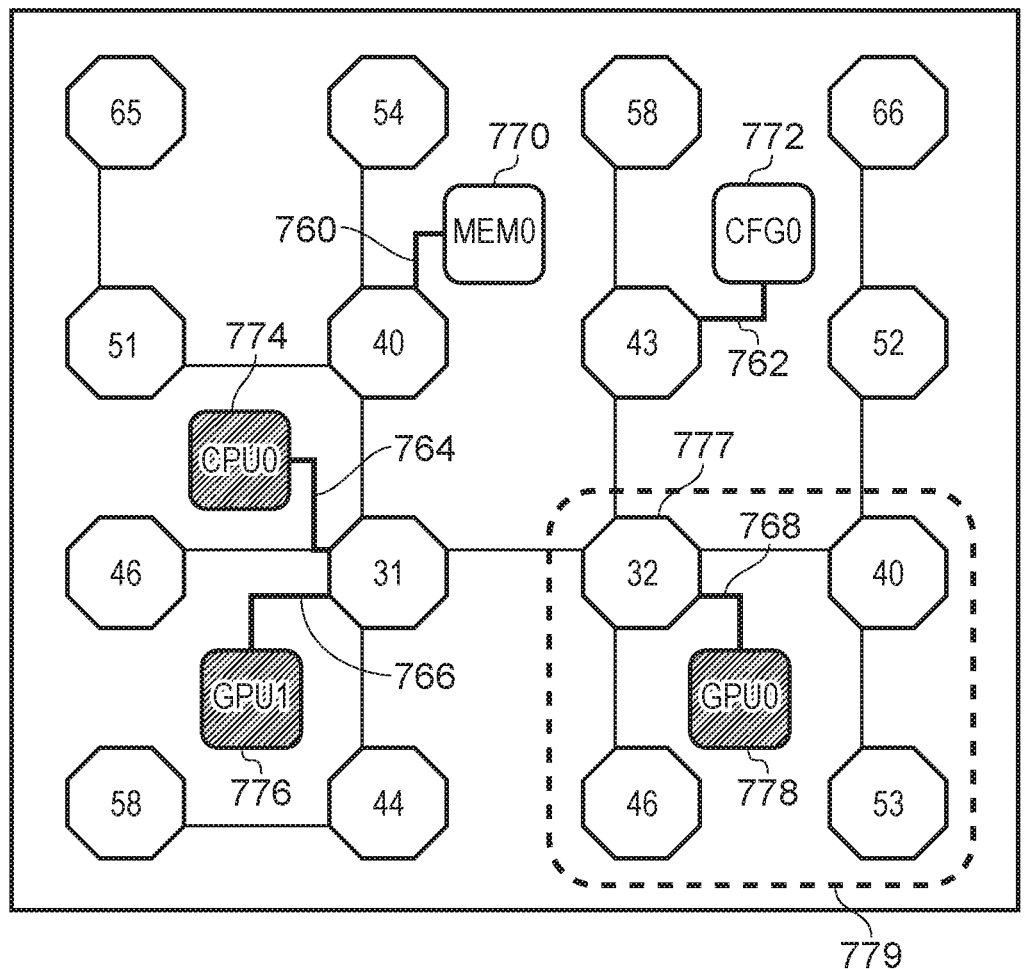

FIG. 9B illustrates how step 530 of FIG. 5A is implemented, assuming the minimum cost tree and compactness index example shown in FIG. 9A. In particular, the dotted line 779 shows the quadrant of nodes associated with the bridge 778. It is assumed that each of the nodes are associated with candidate data routing elements that have at least one available port, and accordingly the bridge 778 is connected via path 768 to the node 777 since it has the lowest CI within the quadrant 779. The connections 760, 762, 764, 766 formed for the other bridges 770, 772, 774, 776 are also shown in FIG. 9B. In all of these cases, it is assumed that the node with the lowest CI also has an available router connection. Otherwise, the bridge will be connected to the node within the quadrant of nodes that has the next lowest CI.

Figure 9C:
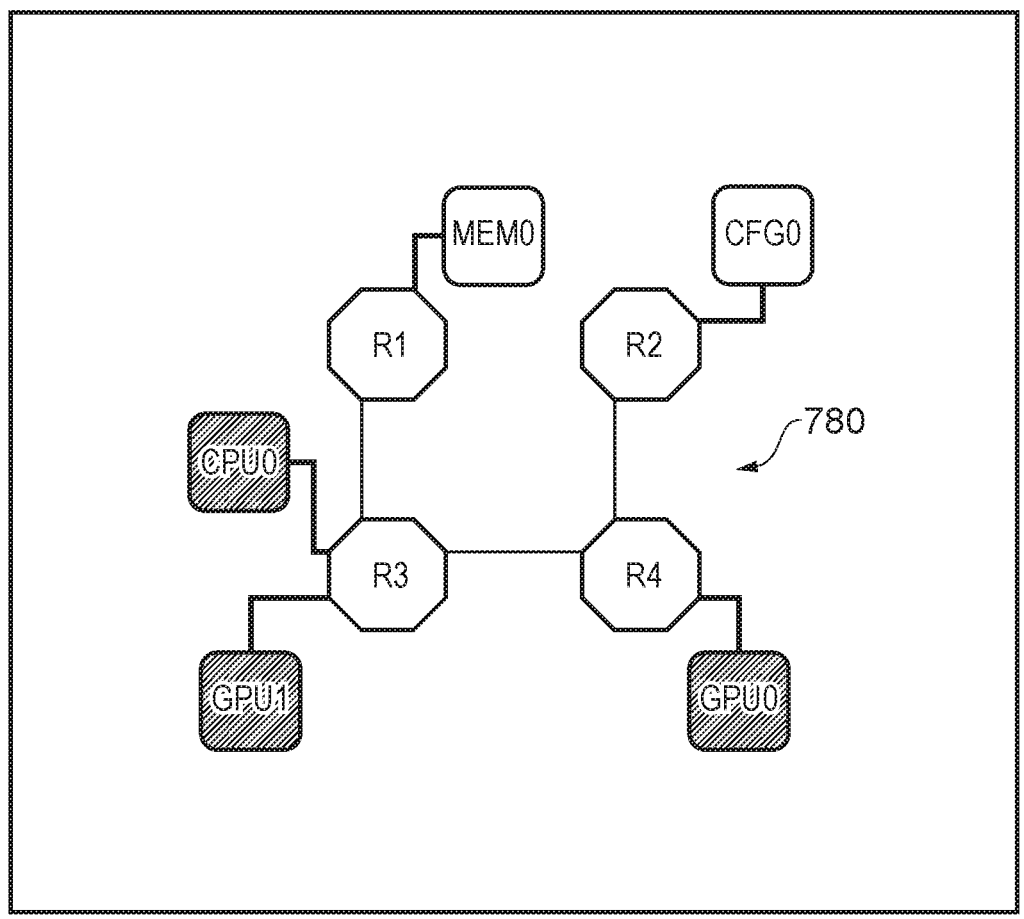

FIG. 9C then illustrates the resultant candidate router network 780 that is produced once the connections shown in FIG. 9B have been made.

Figure 10:
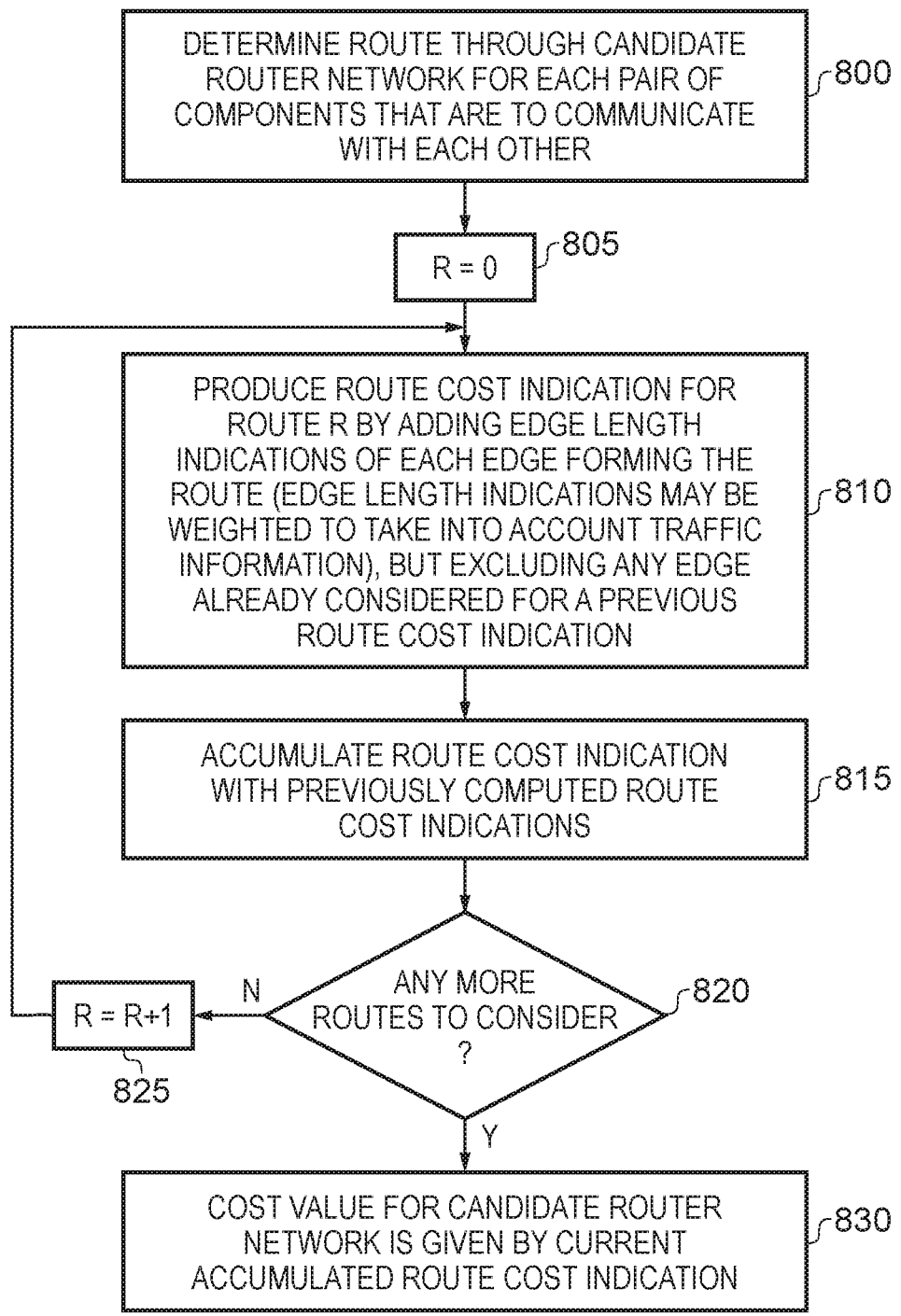
FIG. 10 is a flow diagram illustrating steps that can be performed in order to compute a cost value for a candidate router network at step 540 of FIG. 5B.

FIG. 10 is a flow diagram illustrating the steps that may be performed to compute the cost value for a candidate router network at step 540 of FIG. 5B. At step 800, all of the required routes through the candidate router network are identified. In particular, for each pair of components that are to communicate with each other, the associated route through the candidate router network is determined. Thereafter, the parameter R is set equal to zero at the step 805, and then at step 810 a route cost indication is produced for route R. This can be determined using the cost information associated with each of the edges, which as discussed earlier in one example is provided in terms of an edge length. The edge length can be set equal for each of the edges, or can be weighted if desired, for example to take into account traffic information. For route R, the edge length indications are then added for each of the edges along the route in order to produce the cost indication for route R. In once example arrangement, during this process any edges already considered for a previous route cost indication may be excluded. However, there is no requirement to do this, and in other embodiments the edges may not be excluded if they have been considered previously.

At step 815, the route cost indication is accumulated with any previously computed route cost indications, on the first iteration through steps 810, 815 there being no previous route cost information.

At step 820, it is then determined whether there are any more routes to consider, and if so the parameter R is incremented at step 825, whereafter the process returns to step 810. Once all of the routes have been considered at 820, then the cost value for the candidate router network is given at step 830 by the current accumulated route cost indication.

Figure 11:
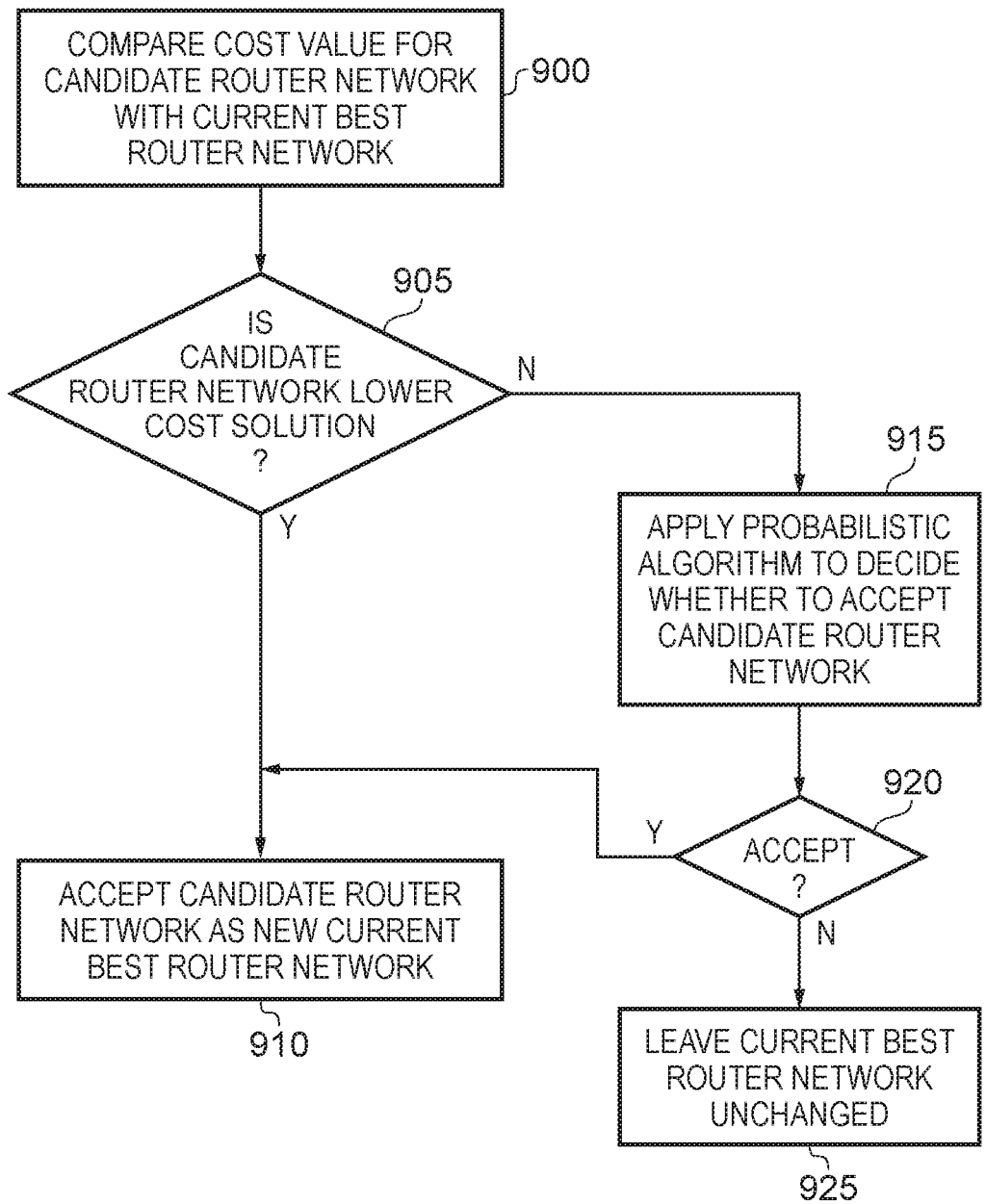
FIG. 11 is a flow diagram illustrating steps that can be performed to implement step 545 of FIG. 5B in accordance with one example arrangement.

FIG. 11 is a flow diagram illustrating how a probabilistic acceptance algorithm can be applied at step 545 of FIG. 5B in order to determine whether to update the current best router network. At step 900, the cost value for the candidate router network is compared with the current best router network. During a first iteration through steps 520 to 545 of FIG. 5A and FIG. 5B, there will be no current best router network, and accordingly no comparison will take place.

At step 905, it is determined whether the candidate router network is the lower cost solution, when compared with the current best router network. If so, the process proceeds to step 910 where the candidate router network is accepted as the new current best router network. On a first iteration, it will be determined that the cost value for the candidate router network is the lowest cost solution currently.

In one example arrangement, if the candidate router network is not the lower cost solution, it can merely be ignored, and the current best router network maintained as the best router network. However, as shown in FIG. 11, in an alternative arrangement a probabilistic algorithm can be applied at step 915 to determine whether to accept the candidate router network even though it is not a lower cost solution. In essence, the cost function that is evaluated in respect of the candidate router networks may be complex, and there may be a number of local minima within the cost function. By iterating the process of FIGS. 5A and 5B a significant number of times, the aim is to seek out a solution which is either the global minima, or close to the global minima. To facilitate this process, it has been found that it is useful, particularly during the early stages of the process, to enable slightly higher cost solutions to still be chosen as the current best router network. In particular, this can prevent the algorithm becoming greedy and as a result progressing towards a particular local minima within the cost function.

Hence, in once arrangement, provided the cost value for the candidate router network under consideration is within a certain percentage of the cost value of the current best router network, it may be allowed to be selected as the new best router network even though it is a higher cost solution. The probability of accepting a higher cost solution can then if desired be reduced as the iterative process repeats so that there is less likelihood of selecting a higher cost solution as the iteration count increases.

At step 920, it is then determined whether to accept the candidate router network, following application of the probabilistic algorithm. If so, then at step 910 the candidate router network is accepted as the new current best router network, whereas otherwise the process proceeds to step 925, where the current best router network is left unchanged.

The above described techniques provide a particularly efficient and rigorous mechanism for determining an optimal router network to be used within an integrated circuit, hence significantly improving the overall circuit design for integrated circuits such as NoCs.

In the present application, the words "configured to . . . " are used to mean that an element of an apparatus has a configuration which is able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be made therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A computer-implemented method of designing a router network to connect components of an integrated circuit, where the router network comprises a plurality of connected data routing elements, the method comprising performing the following steps on a computer:
　generating an undirected graph to represent a mesh of candidate data routing elements, the candidate data routing elements being positioned dependent on at least one characteristic of the integrated circuit, and the undirected graph comprising a node to represent each candidate data routing element and an edge to represent each connection between the candidate data routing elements;
　performing a candidate router network generation process a plurality of times, each performance of the candidate router network generation process comprising:
　　generating a tree structure from a plurality of possible tree structures to interconnect the nodes of the undirected graph;
　　for each node in the tree structure, computing a compactness index indicative of a path cost associated with connections to at least a subset of other nodes in the tree structure;
　　for each component to be connected to the router network, identifying a set of available nodes within the tree structure and connecting the component to a selected node within that set taking account of the compactness index of the nodes within the set, to thereby establish a candidate router network; and
　　computing a cost value for the candidate router network taking into account each pair of components that are to communicate with each other via the candidate router network; and
　selecting, as the router network, one of the candidate router networks based on the computed cost value for each candidate router network.

2. A method as claimed in claim 1, wherein:
　each performance of the candidate router network generation process further comprises applying an acceptance algorithm to determine whether to accept the candidate router network as a current best router network; and the selecting step comprises selecting, as the router network, the current best router network that exists after the candidate router network generation process has been performed the plurality of times.

3. A method as claimed in claim 1, wherein the plurality of times that the candidate router network generation process is performed is programmable.

4. A method as claimed in claim 1, wherein:
the step of generating the tree structure comprises applying a selection policy to select a number k of edges, and removing the selected edges provided the graph remains unsplit, in order to produce a modified undirected graph, and generating the tree structure from the modified undirected graph.

5. A method as claimed in claim 1, wherein the step of generating the tree structure comprises the step of employing a tree generation algorithm to generate, as the tree structure, a minimum cost tree.

6. A method as claimed in claim 5, wherein the minimum cost tree is a Steiner tree.

7. A method as claimed in claim 5, wherein the tree generation algorithm takes into account a weighting associated with at least one edge within the undirected graph.

8. A method as claimed in claim 1, wherein the step of computing the compactness index for a chosen node comprises implementing a path determination algorithm to determine an optimal path through the tree structure between the chosen node and each other node in the tree structure, producing a path cost indication for each determined optimal path, and accumulating the path cost indications to produce the compactness index.

9. A method as claimed in claim 8, wherein the path determination algorithm comprises one of a Breadth-First Search (BFS) algorithm or Dijkstra's algorithm.

10. A method as claimed in claim 8, wherein the step of producing the path cost indication takes into account weighting information associated with the edges.

11. A method as claimed in claim 1, wherein the step of identifying the set of available nodes for a chosen component comprises determining a set of nodes whose associated data routing elements surround the chosen component.

12. A method as claimed in claim 1, wherein the selected node from the set to which the component is connected is that node having the best compactness index amongst the nodes in the set whose associated data routing element has an available connection port.

13. A method as claimed in claim 1, wherein the step of computing the cost value comprises determining the route through the candidate router network between each pair of components that are to communicate with each other via the candidate router network, producing a route cost indication for each determined route taking into account each edge provided within the determined route, and accumulating the route cost indications in order to produce the cost value.

14. A method as claimed in claim 13, wherein when producing the route cost indication for a determined route, an edge within the determined route is excluded when that edge has already been accounted for in the route cost indication produced for one of the other determined routes.

15. A method as claimed in claim 13, wherein an edge cost indication is associated with each edge and the route cost indication for each determined route is produced by taking into account the edge cost indication of each edge provided within the determined route.

16. A method as claimed in claim 15, wherein the edge cost is weighted to take into account information about the traffic to be passed over the associated connection in the candidate router network.

17. A method as claimed in claim 2, wherein the acceptance algorithm determines that the candidate router network is to be accepted as a new current best router network when the cost value for the candidate router network indicates that the candidate router network is a lower cost solution that an existing current best router network.

18. A method as claimed in claim 5, wherein the acceptance algorithm is arranged in certain instances to accept the candidate router network as the new current best router network even though the cost value for the candidate router network indicates that the candidate router network is a higher cost solution that the existing current best router network.

19. A method as claimed in claim 18, wherein the acceptance algorithm is such that the likelihood of accepting the candidate router network as the new current best router network even though the cost value for the candidate router network indicates that the candidate router network is a higher cost solution that the existing current best router network decreases as the number of iterations of the candidate router network generation process increases.

20. A method as claimed in claim 1, further comprising the step, prior to generating the undirected graph, of generating the mesh of candidate data routing elements such that the candidate data routing elements are separated by a maximum physical distance without a need for an intervening buffering element, determined taking into account manufacturing process technology and physical dimension information for the integrated circuit.

21. A method as claimed in claim 20, wherein the step of generating the mesh of candidate data routing elements further comprises at least one of:
deleting candidate data routing elements from any unrouteable areas within the integrated circuit;
deleting candidate data routing elements that overlap with locations of the components within the integrated circuit.

22. An integrated circuit having an integrated circuit design incorporating a router network produced by the method of claim 1.

23. A computer program product comprising a non-transitory machine-readable storage medium on which are stored program instructions which, when executed by the computer processor, cause the computer processor to perform a method of designing a router network to connect components of an integrated circuit, where the router network comprises a plurality of connected data routing elements, the method comprising:
generating an undirected graph to represent a mesh of candidate data routing elements, the candidate data routing elements being positioned dependent on at least one characteristic of the integrated circuit, and the undirected graph comprising a node to represent each candidate data routing element and an edge to represent each connection between the candidate data routing elements;
performing a candidate router network generation process a plurality of times, each performance of the candidate router network generation process comprising:
generating a tree structure from a plurality of possible tree structures to interconnect the nodes of the undirected graph;

for each node in the tree structure, computing a compactness index indicative of a path cost associated with connections to at least a subset of other nodes in the tree structure;

for each component to be connected to the router network, identifying a set of available nodes within the tree structure and connecting the component to a selected node within that set taking account of the compactness index of the nodes within the set, to thereby establish a candidate router network; and computing a cost value for the candidate router network taking into account each pair of components that are to communicate with each other via the candidate router network; and selecting, as the router network, one of the candidate router networks based on the computed cost value for each candidate router network.

* * * * *